US011552953B1

United States Patent
Avadhanam

(10) Patent No.: US 11,552,953 B1
(45) Date of Patent: Jan. 10, 2023

(54) IDENTITY-BASED AUTHENTICATION AND ACCESS CONTROL MECHANISM

(71) Applicant: Amazon Technologies, Inc., Seattle, WA (US)

(72) Inventor: Phani Bhushan Avadhanam, San Diego, CA (US)

(73) Assignee: Amazon Technologies, Inc., Seattle, WA (US)

(*) Notice: Subject to any disclaimer, the term of this patent is extended or adjusted under 35 U.S.C. 154(b) by 219 days.

(21) Appl. No.: 16/011,461

(22) Filed: Jun. 18, 2018

(51) Int. Cl.
  *H04L 29/06* (2006.01)
  *H04L 9/40* (2022.01)

(52) U.S. Cl.
  CPC ........ *H04L 63/102* (2013.01); *H04L 63/0876* (2013.01); *H04L 63/101* (2013.01); *H04L 2463/082* (2013.01)

(58) Field of Classification Search
  CPC . H04L 63/102; H04L 63/0876; H04L 63/101; H04L 2463/082
  See application file for complete search history.

(56) References Cited

U.S. PATENT DOCUMENTS

| | | | | |
|---|---|---|---|---|
| 7,490,347 B1* | 2/2009 | Schneider | ............. | H04L 63/105 713/157 |
| 8,601,531 B1* | 12/2013 | Zolfonoon | ............. | G06F 21/604 726/1 |
| 9,053,307 B1* | 6/2015 | Johansson | ............. | G06F 21/316 |
| 9,185,095 B1* | 11/2015 | Moritz | ................ | H04L 63/0861 |
| 9,485,237 B1* | 11/2016 | Johansson | ............. | H04L 9/3231 |
| 9,888,377 B1* | 2/2018 | McCorkendale | ....... | H04L 63/06 |
| 2004/0210623 A1 | 10/2004 | Hydrie et al. | | |
| 2008/0172366 A1* | 7/2008 | Hannel | .................... | H04L 63/20 |
| 2010/0075658 A1 | 3/2010 | Hou et al. | | |
| 2010/0135307 A1 | 6/2010 | Nakagawa | | |
| 2013/0322257 A1* | 12/2013 | Shimonishi | ........... | H04L 63/104 370/236 |
| 2014/0189829 A1* | 7/2014 | McLachlan | ............. | H04L 63/08 726/6 |
| 2015/0324559 A1* | 11/2015 | Boss | ....................... | H04L 63/08 726/1 |
| 2015/0372870 A1 | 12/2015 | Stiff | | |
| 2016/0065608 A1* | 3/2016 | Futty | ................... | H04L 63/1433 726/25 |

(Continued)

OTHER PUBLICATIONS

U.S. Appl. No. 15/866,183, filed Jan. 9, 2018.

*Primary Examiner* — Taghi T Arani
*Assistant Examiner* — Lin Chang
(74) *Attorney, Agent, or Firm* — Kilpatrick Townsend & Stockton LLP

(57) ABSTRACT

An identity management server can be used to provide identity-based authentication and access control mechanism for devices trying to connect to a network or other devices on the network. The identity management server may authenticate a user associated with a device based on the past behavior information of the user received from another device associated with the user. The identity management server may generate a trust score based on multiple attributes associated with the user and the device, and authenticate the user if the trust score is within an acceptable limit. The identity management server may also generate access permissions for the device, which can be used by a network device to grant or deny access to the network.

20 Claims, 15 Drawing Sheets

(56) References Cited

U.S. PATENT DOCUMENTS

| | | | |
|---|---|---|---|
| 2016/0277396 A1* | 9/2016 | Gardiner | G06V 10/95 |
| 2017/0250968 A1* | 8/2017 | Licht | H04L 9/3271 |
| 2018/0097816 A1* | 4/2018 | Naqvi | G06F 21/6218 |
| 2018/0103039 A1 | 4/2018 | Thaler et al. | |
| 2018/0253985 A1* | 9/2018 | Aggarwal | G09B 7/00 |
| 2018/0332327 A1* | 11/2018 | Helms | H04N 21/6334 |
| 2019/0318370 A1* | 10/2019 | Kopikare | H04L 67/306 |

\* cited by examiner

| FIRST IDENTITY INFORMATION 400 | | |
|---|---|---|
| FIRST USER INFORMATION 114 | FIRST DEVICE INFORMATION 402 | FIRST APPLICATION INFORMATION 404 |
| NAME<br>ADDRESS<br>PHONE NUMBER<br>ACCOUNT NUMBER<br>MEMBERSHIP NUMBER | MAC ADDRESS<br>IP ADDRESS<br>DEVICE VENDOR IDENTIFIER<br>DEVICE IDENTIFIER<br>DEVICE LOCATION<br>TIMESTAMP<br>REBOOT INDICATOR<br>BACKUP INDICATOR<br>SCAN INDICATOR<br>KEY MAP INDICATOR<br>DIGITAL CERTIFICATE INDICATOR<br>NETWORKING METADATA | APIs<br>APPLICATION NAME<br>PATCH INDICATOR<br>APPLICATION VENDOR<br>TIMESTAMP(S)<br>SECURITY ATTRIBUTES<br>SUPPORTED OPERATING SYSTEMS |

| SOURCE DOMAIN 702 | SOURCE VLAN 704 | DESTINATION VLAN 706 | DESTINATION DOMAIN 708 | ACTION TRACKER 710 |
|---|---|---|---|---|
| 602a | V1 | V1 | 602a | PERMIT |
| 602a | V1 | V2 | 602a | PERMIT |
| 602a | V1 | V3 | 602a | PERMIT |
| 602a | V2 | V1 | 602a | PERMIT |
| 602a | V2 | V2 | 602a | PERMIT |
| 602a | V2 | V3 | 602a | PERMIT |
| 602a | V3 | V1 | 602a | PERMIT |
| 602a | V3 | V2 | 602a | PERMIT |
| 602a | V3 | V3 | 602a | PERMIT |

| SOURCE DOMAIN 902 | DESTINATION DOMAIN 904 | ACTION TRACKER 906 |
|---|---|---|
| 602a | 602b | DENY |
| 602a | 602c | ALLOW |
| 602b | 602a | DENY |
| 602b | 602c | ALLOW |
| 602c | 602a | ALLOW |
| 602c | 602b | ALLOW |

IDENTITY-BASED AUTHENTICATION AND ACCESS CONTROL MECHANISM

BACKGROUND

Generally, a user's identity is confirmed using passwords prior to allowing a user access to an account. For more security-sensitive systems, multi-factor authentication may be used. Multi-factor authentication is a method of confirming a user's claimed identity (i.e. authenticating a user) in which a user is granted access only after successfully presenting 2 or more pieces of evidence (or factors) to an authentication mechanism. One of the most common types of multi-factor authentication includes using a password along with a response to a pre-defined set of challenge questions that presumably only the user knows the answers to. However, the general and pre-defined nature of the questions generally render such systems vulnerable to attacks.

BRIEF DESCRIPTION OF THE DRAWINGS

Various embodiments in accordance with the present disclosure will be described with reference to the drawings, in which:

FIG. 4 illustrates a first identity information comprising information for a first device, for a first user of the first device, and for an application installed on the first device, in certain embodiments;

FIG. 7 illustrates an access control matrix configured to store access permissions for the devices for intra-domain access, according to certain embodiments of the disclosed technologies;

FIG. 9 illustrates an access control matrix configured to store access permissions for the devices for inter-domain access, in certain embodiments of the disclosed technologies;

DETAILED DESCRIPTION

Figure 1:
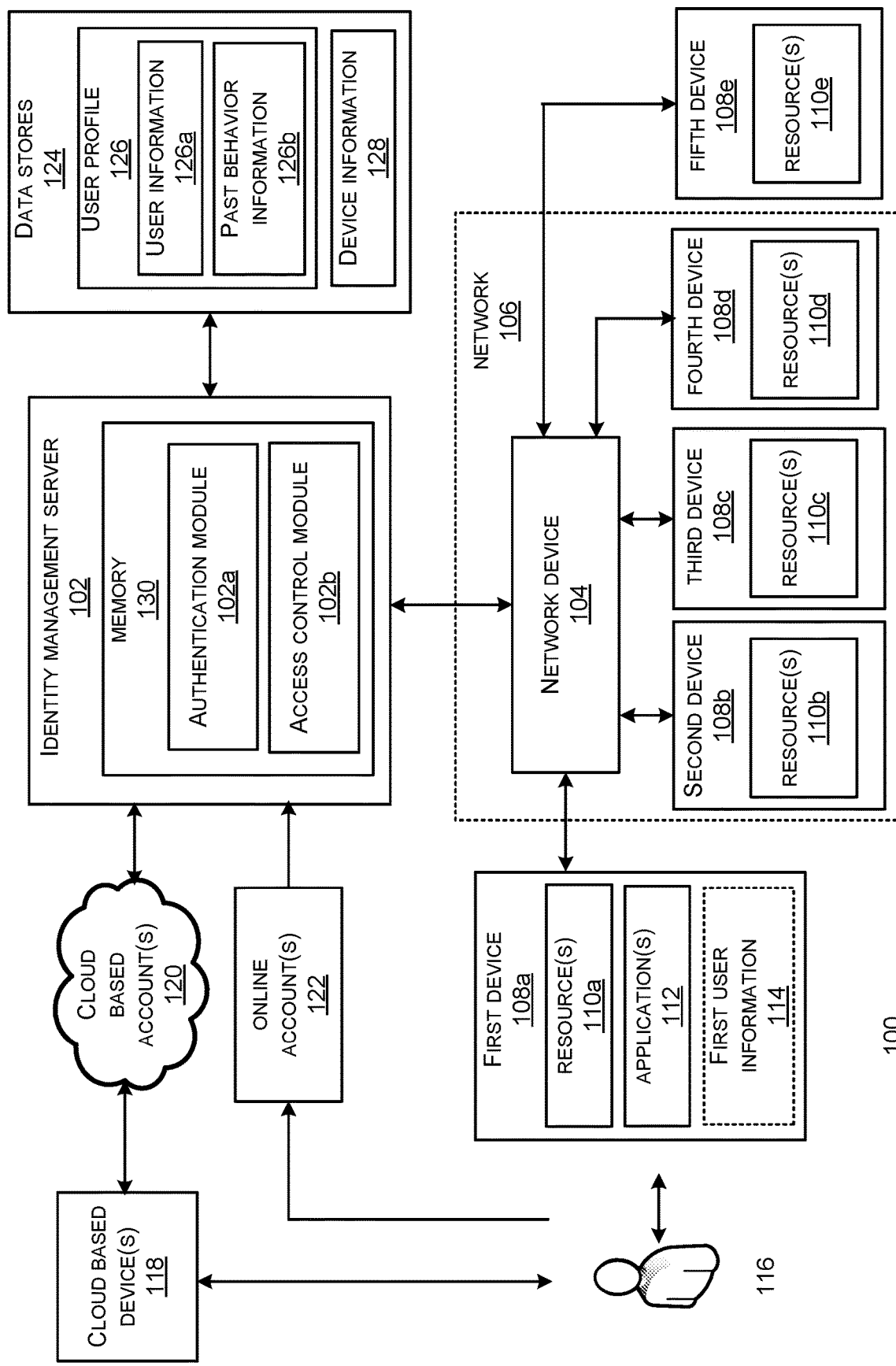
FIG. 1 illustrates a system for providing an identity-based authentication and access control mechanism using an identity management server, according to certain embodiments of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In certain systems, various devices may be capable of communicating with one another over a network using an Internet Protocol (IP) or other protocols. These devices may include mobile devices, servers, computers, desktops, IoT (Internet of Things) devices, etc. For example, fulfillment centers, warehouses, data centers, or other industries with large infrastructure may implement systems with a large number of devices on the network. The network may include multiple virtual local area networks (VLANs) that may be segmented based on certain classification. A network device, e.g., router, switch, or a bridge, may be used to process requests from various devices based on access permissions associated with respective devices. For example, based on the access permissions, a device, a user of the device, or an application executing on the device may or may not be granted access to a network, or to another device or an application executing on the other device. In some instances, the access permissions may be in the form of access control lists (ACLs), which may include rules for different devices.

Certain systems may include infrastructure to support authentication of the devices or the user of the devices using various factors, e.g., tokens, fingerprinting, challenge questions, passwords, personal identification numbers (PINs), etc., to allow or deny access to other devices. These factors are pre-established at the user registration. For example, the challenge questions may be published in advance and the expected responses from the user may be stored. In most instances, adding new factors to the authentication process may require changes in the infrastructure, in deployment or in the application. For example, if the challenge questions need to be changed, it may require a re-registration of the user with the new expected response. Furthermore, the general and pre-defined nature of the questions generally render such systems vulnerable to attacks. Thus, there is a need for a mechanism that can allow adding new factors dynamically with minimal changes to the existing infrastructure.

Certain embodiments of the disclosed technologies can provide systems and methods to dynamically include additional factors for authentication of a user associated with a device, which can be mapped to a lower level access control mechanism using an identity management server. In certain embodiments, the user can be authenticated by considering identity information associated with the device in addition to past behavior information of the user received from another device or account. The device may include a mobile device, a laptop, a computer, a desktop, a server, or an IoT (Internet of Things) device. The identity management server may be coupled to a network device, e.g., a router, a switch, or a bridge, which may be used to process requests from various devices and can forward the identity information of the device to the identity management server. The past behavior information of the user may be determined based on the user's accounts with various cloud-based services or online accounts. The cloud-based services, e.g., Amazon Alexa®, Google Assistant®, Apple Siri®, etc., may be provided by cloud-based devices, e.g., Amazon Echo®, Google Home®, Apple HomePod®, respectively.

In certain embodiments, past behavior information of the user may be determined using the user's purchase history (e.g., Amazon Prime® usage), search history (e.g., using A9, Bing, etc.), interaction with a virtual assistant (Amazon Alexa®), social media interaction, usage history of the cloud devices, etc. For example, usage statistics and usage patterns for the cloud-based devices of the user, questions asked to the virtual assistants, usage of the online accounts, past orders, gift registry, etc. may be used to dynamically introduce non-traditional new factors in authentication of the user. In certain embodiments, machine learning based models can be utilized to dynamically determining challenge questions and expected answers for the user associated with the device based on the past behavior information of the user. Embodiments can provide a more robust and secure method for user authentication since the dynamically generated challenge questions and the expected answers for each user request may be unique for each request as compared to authentication methods using traditional factors that may not change for a long period of time and thus will be more prone to unauthorized access. Additionally, using past behavior information from different sources (e.g., cloud devices, online accounts, etc.) can provide more complexity and depth for authentication which may be harder to replicate by an unauthorized entity. Certain embodiments can also allow integration of new cloud products with the system with minimal changes to the infrastructure.

In certain embodiments, once the identity management server authenticates a user, the identity management server may be configured to provide the user and a device access to the network and its resources based on generating a trust score for the user's device based on multiple attributes associated with the user and the device. In some embodiments, the identity management server may generate a trust score for the device based on the identity information of the device received in the request, and the user information or the device information. The identity management server may generate the trust score by categorizing the identity information, and the user information or the device information into various categories. The identity management server may further generate a component score for each of the categories, and combine all the component scores to provide the trust score. For example, the identity management server may use device information, connectivity information, network information, trust information, or any other relevant information in generating the trust score. The identity management server may authenticate the user of the device to connect to the network, and then, if the trust score is within an acceptable limit or meets a certain threshold, allow access to certain resources on the network.

Some embodiments of the disclosed technologies can provide a centralized management of access control to resources using access permissions, such as ACLs using the identity management server. Centralized management of the access permissions can help reduce the operational overhead for the network as well as improve the overall security of the system by implementing least privilege concepts. In certain embodiments, the identity management server may be configured to manage the access permissions for each device based on the trust score of the device. Once the identity of the user of the device has been authenticated by the identity management server, the device may be logically assigned to a domain based on sensitivity of the resources associated with the domain. A domain may include a logical grouping of a plurality of devices operating in a network. Each device in a respective domain may belong to a virtual local area network (VLAN). In certain embodiments, once a device is assigned to a domain, the device may have access to the resources associated with that domain. The resources may be identified using a media access control (MAC) address, an Internet Protocol (IP) address, a port, or any physically detectable attribute. The identity management server may maintain the domains and an access control matrix for access permissions of the devices in memory.

The identity management server may also be configured to manage access of the devices across the domains. A device belonging to a first domain requesting access to resources associated with a second domain may or may not be granted access based on the sensitivity level of the resources associated with the second domain. The identity management server may compare the trust score of the device with a domain score for the second domain, which may correspond to the sensitivity level of the resources associated within the second domain. If the difference between the trust score and the domain score is within a threshold value, the device may be granted access to the second domain. The identity management server may then update the access permissions associated with the device and provide the updated access permissions to the network device. The network device may grant the access between the devices from the first domain to resources in the second domain based on the updated access permissions.

The identity management server may also perform periodic renewal, update, invalidation or deletion of access permissions on each of the network devices using the periodic access requirements, thus ensuring that access permissions are aged off of the network device. Such a policy can avoid build-up of stale access permissions over time on a network device that contributes to the complexity and overhead of maintaining access permissions.

Embodiments of the disclosed technologies can provide built-in updates and maintenance of the access permissions among devices with the use of a centralized identity management server using automatic authentication of the users of the devices based on events occurring in the network and mapping to the access controls implemented at the network device level, thus reducing the operational overhead of maintaining network accesses between the devices. The identity-based management of the access permissions can further allow a robust and secure approach for network access control. Certain embodiments disclosed herein may be utilized in industrial, retail, manufacturing and critical infrastructure or other industries that involve a large number of devices.

FIG. 1 illustrates a system 100 for providing identity-based authentication and access control using an identity management server, according to certain embodiments of the disclosed technologies.

The system 100 may include an identity management server 102 coupled to a network device 104 and data stores 124. The system 100 may also include multiple devices, e.g., a first device 108a, a second device 108b, a third device 108c, a fourth device 108d, and a fifth device 108e. The second device 108b, the third device 108c, and the fourth device 108d may be included in a network 106 via the network device 104. The first device 108a and the fifth device 108e may be attempting to connect to the network 106 or to another device on the network 106. Note that even though the system 100 shows five devices, it will be understood that any number of devices may be supported by the system 100 without deviating from the scope of the disclosed technologies.

The first device 108a may include one or more resources 110a, the second device 108b may include one or more resources 110b, the third device 108c may include one or more resources 110c, the fourth device 108d may include one or more resources 110d, and the fifth device 108e may include one or more resources 110e. Each of the resources 110a, 110b, 110c, 110d, and 110e may be identified using a respective media access control (MAC) address, an Internet Protocol (IP) address, a port, or any physically detectable attribute. For example, the devices 108a, 108b, 108c, 108d, and 108e may include network interface adapters or a network interface card with a specific MAC address to connect with a network. The devices 108b, 108c, 108d, and 108e may include mobile devices, servers, desktop computers, storage devices, IoT devices, robotic devices, or other suitable electronic devices.

In certain embodiments, the devices 108a, 108b, 108c, 108d, and 108e may also include devices that are virtual instantiations of the devices. For example, a new virtual device may be instantiated with a new identity (e.g., MAC address) on a physical device already connected to the network device. Such an instantiation of the new virtual device in the network 106 may also result in generation of a network connection request and the requirement of access permissions, as discussed in more detail later. An instantiation of a virtual device may include an instantiation of a virtual machine corresponding to the virtual device on a physical device that supports virtualization technology. The devices 108a, 108b, 108c, 108d, and 108e may have been pre-approved to operate in the environment where the system 100 may be used. For example, the devices 108a, 108b, 108c, 108d, and 108e may have been authenticated using a certain protocol, e.g., network access control (NAC), 802.1X protocol by Institute of Electrical and Electronics Engineers (IEEE), etc.

The first device 108a may be associated with a first user 116. For example, the first device 108a may include a mobile device, a laptop, a desktop, or a personal computer. The first device 108a may comprise a first user information 114 associated with the first user 116. In some embodiments, the first user information 114 may include a name, an address, a phone number, an account number, or a membership number of the first user 116. The resources 110a associated with the first device 108a may be identified using a MAC address, an IP address, a port, or any physically detectable attribute. In some instances, one or more applications 112 may be executing or scheduled to be executed on the first device 108a. For example, the application 112 may be associated with banking, social media, an online store, an online news magazine, etc.

The first user 116 may be associated with one or more cloud-based devices 118, e.g., Amazon Echo®, Google Home®, Apple HomePod®, etc., which can provide cloud-based services, e.g., Amazon Alexa®, Google Assistant®, Apple Siri®, etc. The first user 116 may have one or more cloud-based accounts 120 to access cloud-based services provided by the cloud-based devices 118. The first user 116 may also have one or more online accounts 122 for online stores, online subscriptions, social media, e.g., Amazon Prime®, Netflix®, etc.

The identity management server 102 may be configured to authenticate the first user 116 requesting an access to the network 106 using the first device 108a. The identity management server 102 may have access to the cloud-based accounts 120 and the online accounts 122 of each user. In some embodiments, information associated with the cloud-based accounts 120 and the online accounts 122 of each user may be stored in the data stores 124. The data stores 124 may be internal or external to the identity management server 102. The identity management server 102 may include memory 130. For example, in some embodiments, the data stores 124 may be part of the memory 130. The data stores 124 may include random access memories (e.g., DRAM, SDRAM, SRAM, etc.), ROMs, flash memory, or any suitable memory device. The identity management server 102 may utilize any suitable data structures, databases, or data stores to store the information associated with various users and the devices. The data stores 124 may be configured to store a respective user profile 126 and device information 128 for a plurality of users. The user profile 126 may include user information 126a and past behavior information 126b for the user. An example user profile is discussed with reference to FIG. 2. The device information 128 is discussed with reference to FIG. 3.

Figure 2:
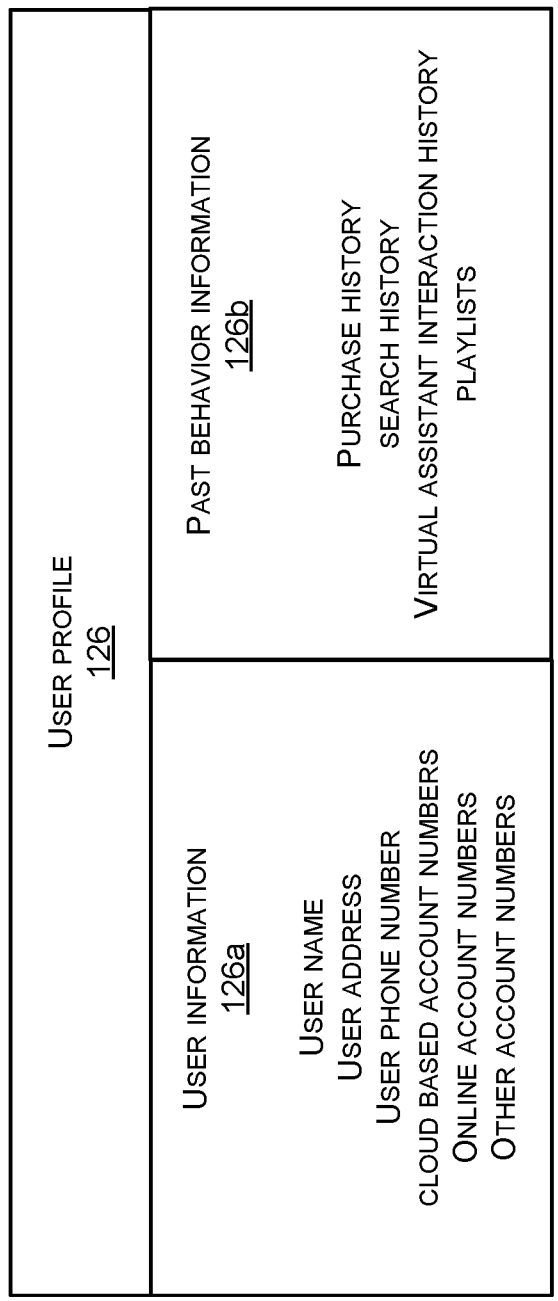
FIG. 2 illustrates an example of a user profile for a user comprising user information and past behavior information, in certain embodiments of the disclosed technologies.

FIG. 2 illustrates an example of the user profile 126 comprising the user information 126a and the past behavior information 126b, in certain embodiments of the disclosed technologies.

The user information 126a may include a user name, a user address, a user phone number, cloud-based account numbers of the user, online account numbers of the user and any other account numbers of the user. For example, for the first user 116, the cloud-based account numbers may belong to the cloud-based accounts 120 (e.g., Amazon Echo® account) and the online account numbers may belong to the online accounts 122 (e.g., Amazon Prime® account) of the first user 116. In some instances, the other account numbers of the first user 116 may belong to a payment account number (e.g., credit or debit card account).

The past behavior information 126b may include purchase history, search history, virtual assistant interaction history, playlists, or other behavior history of the user. For example, the purchase history may include purchases made by the first user 116 over a certain period of time (e.g., daily, weekly, or monthly) using the online account numbers or other account numbers. The search history may include web searches performed using online search engines. The virtual assistant interaction history may include interaction with a virtual assistant using the cloud-based accounts, e.g., questions asked to Amazon Alexa®. The playlists may include music playlists for the first user 116.

Figure 3:
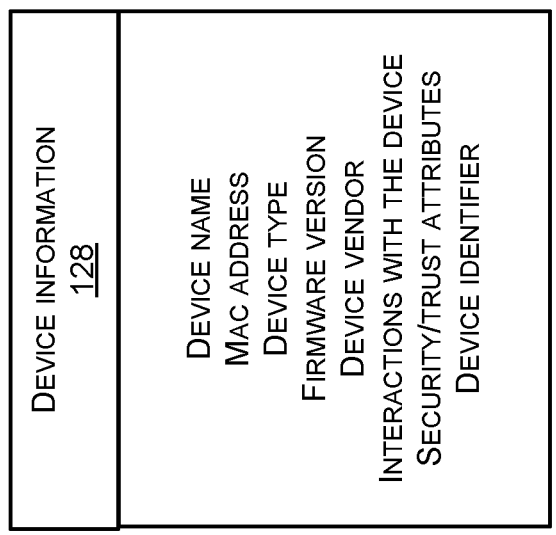
FIG. 3 illustrates an example device information for a device associated with the user, in certain embodiments of the disclosed technologies.

FIG. 3 illustrates an example device information 128 for a device associated with the user, in certain embodiments of the disclosed technologies. The device information 128 may be associated with the first user 116.

Some non-limiting examples of the device information 128 may include a device name, a MAC address, a device type, a firmware version executing on the device, a device vendor, previous interactions with the device, any trust and/or security attributes associated with the device, and a device identifier. The device name may indicate a name for the first device 108a, e.g., Jane's phone. The MAC address may belong to a MAC address of the first device 108a. The MAC address may be used as a unique identifier for the first device 108a for network communications based on a network protocol, e.g., Ethernet, Wi-Fi, etc. The device type may indicate a type of the device (e.g., mobile phone, laptop, etc.). The device identifier may include a serial number, a model number, or a device number. The firmware version may indicate a version of the firmware executing on the device. The device vendor may indicate a vendor of the device. The interactions with the device may include information associated with any previous transactions performed with the device. The trust and/or security attributes may include information associated with any cryptographic keys, digital certificates, etc. for the device. Device information 128 may be aggregated over time from various sources, such as a trusted device manager, device manufacturer/vendor or previous interactions with any particular device.

Referring back to FIG. 1, the network device 104 may be configured to receive requests from the devices to connect to the network 106 or to communicate with another device on the network 106. In one instance, the first user 116 may send a request to access a resource on the network 106 using the first device 108a. For example, the first user 116 may attempt to access a website to make a purchase or use a search engine using a mobile device. The first device 108a may send a request to connect to the network 106. In one embodiment, the request may be an explicit request from the first device 108a to connect to the network 106 via the network device 104 using a network packet (e.g., an Ethernet packet). In another embodiment, the network device 104 may detect a new device on a port (e.g., change in physical load on the port) and request identification from the first device 108a prior to allowing the first device 108a access to the network 106. In some embodiments, the first device 108a may be connected to the network device 104 via one or more routers, switches, or other suitable network devices. For example, the first device 108a may be connected to the network device 104 via a console router, a wide area network (WAN) router, or an aggregate router, which are not shown here for the purposes of simplicity. The console router may include a first stage router which may be connected to a console (e.g., a user interface) or the first device 108a. The WAN router may be used to connect various networks (e.g., LANs) over a geographical distance. The aggregate router may be used for certain specific functionalities in addition to the functionalities of a typical router.

The network device 104 may include a router, a switch, a hub, a bridge, or any suitable device capable of enabling communication between two devices on the same or different networks. In some embodiments, the networks 106 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc.

In some embodiments, the request sent by the first device 108a may include a first identity information. For example, the first identity information may include the first user information 114 associated with the first user 116 of the first device 108a. In some instances, the first identity information may also include device information associated with the first device 108a, and application information associated with the application 112. The request sent by the first device 108a may be part of a packet based on a suitable network protocol. An example first identity information is discussed with reference to FIG. 4.

FIG. 4 illustrates a first identity information 400 comprising information for the first device 108a, the first user 116 of the first device 108a, and for the application 112 installed on the first device 108a, in certain embodiments. For example, the first identity information 400 may comprise the first user information 114, a first device information 402 and a first application information 404.

The first user information 114 may include information about the first user 116 of the first device 108a initiating a request to connect to the network 106. Some non-limiting examples of the first user information 114 may include a name, an address, a phone number, an account number (e.g., a Social Security number or a bank account number), or a membership number of the first user 116 of the first device 108a. In one instance, the first user 116 may be using the first device 108a (e.g., a mobile device) to connect to the network 106 to access a resource (e.g., a search engine, an online store) associated with another device. The identity management server 102 may use the first user information 114 to retrieve the user profile 126 of the first user 116 and the device information 128 from the data stores 124. For example, certain attributes or a combination of the attributes from the first user information 114 may be used to access the data structures storing the user profiles 126 and the device information 128 in the data stores 124.

The first device information 402 may include information for the first device 108a initiating the request to connect to the network 106, or to access a resource on the network 106. Some of the attributes of the first device information 402 may be provided by the first device 108a and some other attributes may be provided by the network device 104 prior to forwarding the first identity information 400 to the identity management sever 102. Some non-limiting examples of the first device information 402 may include a MAC address, an IP address, a device vendor identifier, a device identifier, a device location, a time stamp, a reboot indicator, a backup indicator, a scan indicator, a key map indicator, a digital certificate indicator, and networking metadata. The MAC address may indicate a network address for the first device 108a. The IP address may be an identifier assigned to the first device 108a to communicate with another device or a resource on the network 106 using an Internet protocol (e.g., IPv4, IPv6). The device vendor identifier may include an identifier for the vendor or manufacturer of the first device 108a. The device identifier may include a serial number, or a model number of the first device 108a. The device location may include a geographic location where the first device 108a may be located when requesting the access. The timestamp may include a local date and time when the request was initiated. The reboot indicator may include a date and time when the first device 108a was last rebooted. The backup indicator may include a timestamp when the last backup of the first device 108a was performed. The scan indicator may include information associated with a last scan of the first device 108a for any potential viruses or threats. The key map indicator may be used to indicate a keyboard layout for the first device 108a. The digital certificate indicator may be used to indicate whether a digital certificate (X.509) is present for secure communication by the first device 108a on the network 106.

The networking metadata may include information associated with one or more networking devices communicatively coupled to the first device 108a. For example, the networking metadata may include metadata associated with a console router, a WAN router, or an aggregate router communicatively coupled to the first device 108a. Some non-limiting examples of the metadata may include information associated with firmware for the router, a manufacturer of the router, an operating system executing on the router, a serial number or a device identifier for the router, or a MAC address. It will be noted that, based on the type of the first device 108a (e.g., a mobile phone, a notebook, a laptop, or a desktop), some of the first device information 402 or different device information may be used for the first identity information 400 without deviating from the scope of the disclosed technologies.

The first application information 404 may include information for an application executing on the first device 108a or scheduled to be executed on the first device 108a. Some non-limiting examples of the first application information 404 may include application programming interfaces (APIs) information, an application name, a patch indicator, an application vendor, timestamps, security attributes, and operating systems supported by the application. The APIs information may include information associated with the APIs for the applications 112 executing or scheduled to be executed on the first device 108a. The application name may include a name for the application 112 installed on the first device 108a. The patch indicator may indicate a patch number or a version number for the application 112. The application vendor may indicate a vendor or a supplier of the application 112. The time stamps may include a first timestamp for when the application 112 was last seen by the identity management server 102, and a second timestamp for when the application 112 was last seen by the access controls on the network device 104. The security attributes may include attributes associated with cryptographic keys, digital certificates, or other attributes to establish trust in the application 112. The supported operating systems may indicate names and versions of the operating systems supported by the application 112.

Referring back to FIG. 1, the network device 104 may be configured to parse the request from the first device 108a to extract the first identity information 400 associated with the first device 108a. The network device 104 may send the first identity information 400 to query the identity management server 102. The network device 104 may send additional information with the first identity information 400, or send only a portion of the first identity information 400 to the identity management server 102. In some embodiments, a network packet for the request sent by the network device 104 to the identity management server 102 may utilize a different protocol than the network packet sent by the first device 108a to the network device 104 to query the identity management server 102.

The identity management server 102 may be configured to receive the first identity information 400 from the first device 108a, based on a request from the first device 108a to access the network 106. The identity management server 102 may be configured to authenticate the first user 116 requesting the access to the network 106 using the first device 108a, and generate access permissions which can be used by the network device 104 to grant or deny the access. The identity management server 102 may include an authentication module 102a and an access control module 102b. The identity management server 102 may include additional components which will be described in further detail with reference to FIG. 12.

The authentication module 102a may be configured to authenticate the first user 116 based on the past behavior information for the first user 116 received from another device associated with the first user 116. For example, the authentication module 102a may be configured to access, using the first identity information 400, the past behavior information 126b for the first user 116 from the cloud-based devices 118 associated with the first user 116. In some embodiments, the authentication module 102a may use the name, address, phone number, or an account number of the first user 116 to access the user profile 126 stored in the data stores 124, and determine that an online- or a cloud-based account exists for the first user 116 based on the user information 126a in the user profile 126. For example, the first user 116 may be in frequent use of an Amazon Alexa® device using their Amazon® account for cloud services. The user profile 126 may include the user's use of the Amazon Alexa® device.

The authentication module 102a may be configured to determine a set of challenge questions for the first user 116 based on the past behavior information 126b for the first user 116. The authentication module 102a may be configured to dynamically generate the set of challenge questions and an expected response from first device 108a based on the past behavior information 126b for the first user 116. In some embodiments, the set of challenge questions and the expected response may be determined using a machine learning model based on the past behavior information 126b. For example, the set of challenge questions may include questions about a recent purchase made by the first user 116 using their Amazon Prime® account, a question asked to Amazon Alexa® by the first user 116, or a playlist for the first user 116. Using past behavior information from different sources (e.g., cloud devices, online accounts, etc.) can provide more complexity and depth for authentication which may be harder to replicate by an unauthorized entity. In certain embodiments, each set of challenge questions for the first device 108a and an expected response to each respective set of challenge questions from the first device 108a can be unique over a period of time. The authentication module 102a may be further configured to present the set of challenge questions to the first device 108a via the network device 104. The authentication module 102a may be configured to validate the identity of the first user 116 based on the response to the set of challenge questions from the first device 108a. For example, the authentication module 102a may compare the response received from the first device 108a with the expected response and if there is a match, the first user 116 can be authenticated by being associated with the first device 108a. By dynamically generating the challenge questions and the expected answers, which may be unique for each user request, certain embodiments can provide a more robust and secure method for user authentication as compared to authentication methods using traditional factors that may not change for a long period of time and thus will be more prone to unauthorized access.

The access control module 102b may be configured to generate a trust score based on multiple attributes associated with the first user 116 and the first device 108a. For example, the access control module 102b may generate a trust score of the first device 108a using the first identity information 400, and the user information 126a for the first user 116 or the device information 128 for the first device 108a stored in the data stores 124. In some embodiments, the access control module 102b may generate the trust score by categorizing the first identity information 400, and the user information 126a or the device information 128 into various categories. For example, the categories may include one or more of network information, backup information, device scan information, trust information, connectivity information, or device information, which may be derived from the first identity information 400, and the user information 126*a* and/or the device information 128. The access control module 102*b* may be configured to generate a component score for each of the categories by performing a weighted average of the values in each of the respective categories. The access control module 102*b* may be further configured to generate the trust score comprising the component scores or a band of scores. In some implementations, the access control module 102*b* may utilize mathematical libraries to generate the band of scores from metadata associated with the first identity information 400, and the user information 126*a* or the device information 128.

Figure 5:
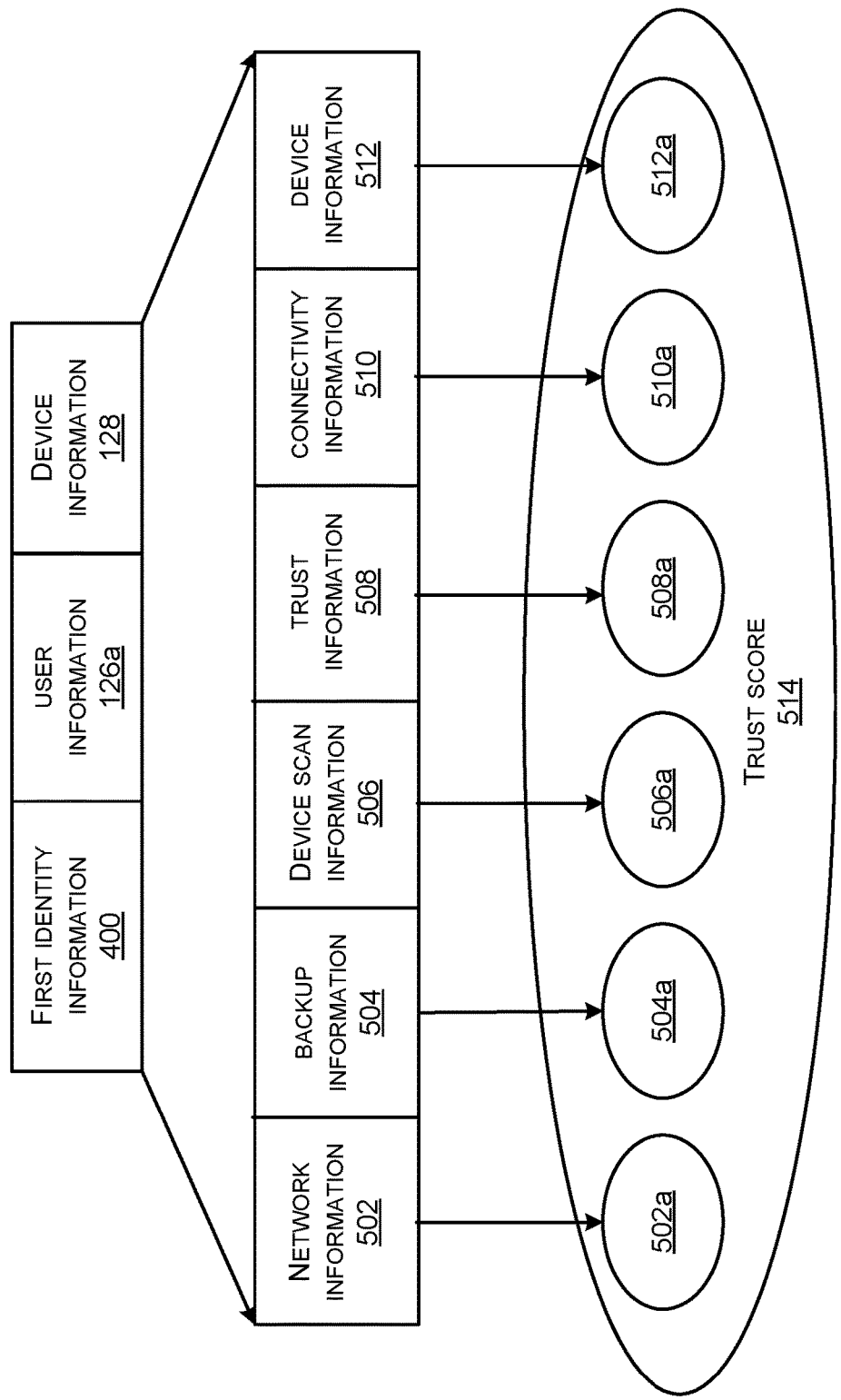
FIG. 5 illustrates generation of a trust score using the first identity information, and the user information or the device information, according to certain embodiments.

FIG. 5 illustrates generation of the trust score using the first identity information 400, and the user information 126*a* or the device information 128, according to certain embodiments.

In some implementations, the first identity information 400, and the user information 126*a* or the device information 128 may be categorized into one or more of network information 502, backup information 504, device scan information 506, trust information 508, connectivity information 510 or device information 512. The network information 502 may be derived from the networking metadata and other network related data in the first device information 402. The backup information 504 may be derived from the backup indicator and the reboot indicator from the first identity information 400. The device scan information 506 may be derived from the scan indicator from the first identity information 400. The trust information 508 may be derived from the digital certificate indicator from the first identity information 400. The connectivity information 510 may be derived from the MAC address and the IP address. The device information 512 may be derived from the device information 128 and the user information 126*a*.

The network information 502, backup information 504, device scan information 506, trust information 508, connectivity information 510 or the device information 512 may be used to generate a component score 502*a*, component score 504*a*, component score 506*a*, component score 508*a*, component score 510*a*, and a component score 512*a* respectively. The component score 502*a* may be generated by performing a weighted average of the values in the network information 502, the component score 504*a* may be generated by performing a weighted average of the values in the backup information 504, the component score 506*a* may be generated by performing a weighted average of the values in the device scan information 506, the component score 508*a* may be generated by performing a weighted average of the values in the trust information 508, the component score 510*a* may be generated by performing a weighted average of the values in the connectivity information 510, and the component score 512*a* may be generated by performing a weighted average of the values in the device information 512. The trust score 514 may comprise the component scores 502*a*-512*a*. The trust score for each device may be stored in the data stores 124 or at the identity management server 102, which can be used by the identity management server 102 to generate access permissions to different domains, or to authenticate the device for subsequent requests.

Once a device is connected to the network and a session is in progress using the access packets, certain fields in the access packets may include information associated with the trust score. Certain embodiments may be used to protect against man-in-the-middle attacks using the trust score in the access packets. The man-in-the-middle attack is a form of eavesdropping where communication between two entities can be monitored and modified by an unauthorized entity. In some instances, if a device is compromised by a man-in-the-middle, the trust score generated for the compromised device may be different from the trust score stored at the identity management server 102. In another instance, if the man-in-the-middle is piggybacking an existing connection and is not on the device, the trust score may be missing in the access packet. In such cases, the identity management server 102 may repeat the authentication process, e.g., by generating another set of challenge questions and expected answers, to authenticate the device and the user.

Referring back to FIG. 1, the access control module 102*b* may be further configured to generate access permissions for the first device 108*a* to a first domain once the first user 116 has been authenticated. In some embodiments, the access control module 102*b* may be configured to compare the trust score of the first device 108*a* with a domain score associated with the first domain and generate the access permissions if the trust score is within a resource threshold. The domain score and/or resource threshold may be based on the sensitivity level of the resources associated with the first domain. The access control module 102*b* may be configured to transmit the access permissions for the first device 108*a* to be installed at the network device 104. The access permissions, upon installation at the network device 104, can enable the first device 108*a* access to the resources associated with the first domain via the network device 104. For example, the resources associated with the first domain may include the resources associated with all the devices within the first domain.

The network device 104 may be configured to store access permissions associated with each of the devices. In some implementations, the access permissions may be in the form of an ACL. The access permissions may include various rules associated with the devices. For example, the access permissions may include rules to permit access to other devices, to permit certain operations on given devices, etc. Based on the access permissions, the network devices 104 may allow or deny access by a source device to communicate with a destination device. In certain embodiments, the access permissions on the network device 104 may be periodically aged, and can be either renewed, updated or invalidated, to avoid stale access permissions from persisting in the environment. Stale access permissions on the network devices may generally create maintenance overhead, and operational and security risks to the overall network. An example sequence of steps for the first device 108*a* to connect to the network 106 is described with reference to FIG. 6.

Figure 6:
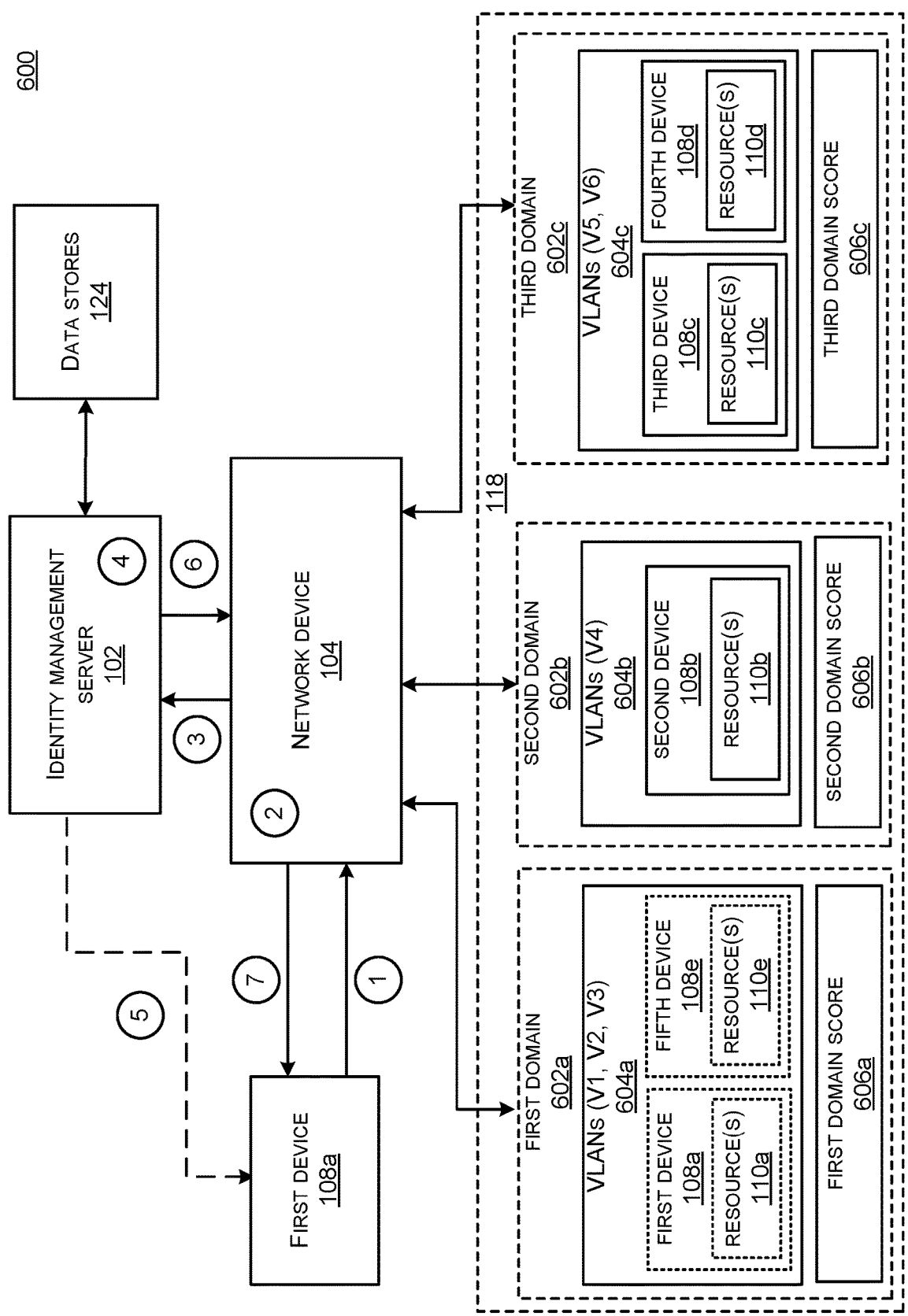
FIG. 6 illustrates a sequence of steps for the first device to gain access to a first domain on a network using the identity management server, according to certain embodiments of the disclosed technologies.

FIG. 6 illustrates a sequence of steps for the first device 108*a* to gain access to a first domain on the network 106 using the identity management server 102, according to certain embodiments of the disclosed technologies. As shown in FIG. 6, a system 600 may include similar components as the system 100 of FIG. 1. The second device 108*b*, the third device 108*c* and the fourth device 108*d* may already be on the network 106. The first device 108*a* and the fifth device 108*e* may not be on the network 106 yet.

The network 106 may be segmented into domains. For example, a domain may include a group of devices belonging to one or more VLANs. In certain embodiments, different devices belonging to one or more VLANs may be logically grouped into respective domains based on different levels of sensitivity of resources associated with the devices. For example, the resources with a high level of sensitivity may be associated with personal data of an organization's employees and clients, the organization's trade secrets, etc. The resources with a lower level of sensitivity may be associated with the organization's publicly available data, e.g., product catalogues, library, etc. In some embodiments, domain information and the sensitivity levels of the resources for all the devices may be stored in the data stores 124, which may be accessible to the identity management server 102.

In one embodiment, the second device 108b may belong to the second domain 602b, and the third device 108c and the fourth device 108d may belong to the third domain 602c. A first domain score 606a may be associated with the first domain 602a based on the sensitivity level of resources associated with the first domain 602a. A second domain score 606b may be associated with the second domain 602b based on the sensitivity level of resources associated with the second domain 602b. The sensitivity level of resources associated with the second domain 602b may correspond to the sensitivity level of the resources 110b. A third domain score 606c may be associated with the third domain 602c based on the sensitivity level of resources associated with the third domain 602c. The sensitivity level of resources associated with the third domain 602c may correspond to the sensitivity level of the resources 110c and 110d.

A first domain 602a may include one or more VLANs 604a, a second domain 602b may include one or more VLANs 604b, and a third domain 602c may include one or more VLANs 604c. The VLANs 604a may include VLANs V1, V2, and V3; the VLANs 604b may include VLANs V4, and V5; and the VLANs 604c may include a VLAN V6. A VLAN may represent a logical grouping of devices that may appear to be on the same local area network irrespective of their geographical distribution. Each VLAN may represent a broadcast domain in a layer 2 of the OSI (open systems interconnection) model. The network device 104 may be used to interconnect different VLAN devices. Each VLAN may be associated with a VLAN number, a VLAN name, a VLAN type, a maximum transmission unit (MTU) for the VLAN, a VLAN state (active or suspended) or any other relevant information. In some implementations, the network 106 may represent a physical network comprising multiple VLANs which can be differentiated using specific tags attached to the packets.

In step 1, the first device 108a may send a request to connect to the network 106. In certain embodiments, a network connection request may result from the first device 108a connecting to the network 106 for the first time. In one embodiment, the request may be an explicit request from the first device 108a to connect to the network 106 via the network device 104 using a network packet (e.g., an Ethernet packet). In another embodiment, the network device 104 may detect a new device on a port (e.g., change in physical load on the port) and request identification from the first device 108a prior to allowing the first device 108a access to the network 106. In certain other embodiments, the network connection request may be a request from the first device 108a to connect to another device on the network 106. The network connection request may be part of a packet received at one of the ports of the network device 104. The packet may be an internet protocol (IP) packet or any other network packet based on a network protocol. The packet may include a header and a payload. The header may include a source IP address, a destination IP address, a packet length, a protocol type, a protocol version, and other relevant information. The first device 108a may send the packet to the network device 104 via a wired or wireless communication channel.

In step 2, the network device 104 may process the packet sent by the first device 108a. The network device 104 may parse the packet to extract an identity information of the first device 108a. The identity information may be the first identity information 400 in FIG. 4. If there are no devices assigned to the first domain 602a at this instance, access permissions may not be available at the network device 104 for the first device 108a.

In step 3, the network device 104 may query the identity management server 102 regarding the first device 108a. For example, the network device 104 may transmit the first identity information 400 in a packet to the identity management server 102 using any suitable network protocol. In some embodiments, the network device 104 may transmit some information from the first identity information 400 and some additional information to the identity management server 102. For example, the additional information may include information associated with the network connectivity of the first device 108a, a scan of the first device 108a, or any other information available to the network device 104 for the first device 108a, which was not provided by the first device 108a in the request.

In step 4, the identity management server 102 may receive the first identity information 400 for the first device 108a. The first identity information 400 may include the first user information 114 and the first device information 402. In some embodiments, the first identity information 400 may also include the first application information 404 for an application executing or scheduled to be executed on the first device 108a. The identity management server 102 may access, from the data stores 124, the user profile 126 of the first user 116 associated with the first device 108a using the first identity information 400. For example, the identity management server 102 may use portions of the first user information 114, the first device information 402, or the first application information 404 from the first identity information 400 to extract the user profile 126 stored in the data stores. The identity management server 102 may access the past behavior information 126b for the first user 116 from the user profile 126. The past behavior information 126b for the first user 116 may have been received from the one or more cloud-based devices 118. The identity management server 102 may authenticate the first user 116 using the past behavior information 126b for the first user 116. In some embodiments, as part of the authentication, the identity management server 102 may determine a set of challenge questions for the first user 116 based on the past behavior information 126b for the first user 116. The set of challenge questions may be dynamically generated based on the past behavior information 126b received from the cloud-based device 118.

In step 5, the identity management server 102 may present the set of challenge questions to the first device 108a. For example, the identity management server 102 may present the set of challenge questions to the first device 108a or the first user 116 using the IP address of the first device 108a from the first identity information 400 based on the request. In some instances, a secure communication channel may have been established between the first device 108a and the identity management server 102 using the IP address. The identity management server 102 may receive a response to the set of challenge questions from the first device 108a using the secure communication channel. The identity management server 102 may validate the identity of the first user 116 based on the response to the set of challenge questions from the first device 108a.

In step 6, the identity management server 102 may generate, upon authentication of the first user 116, access permissions for the first device 108a to a domain. In some embodiments, the identity management server 102 may determine a membership of the first device 108a to a domain based on a domain score associated with the domain and the trust score 514 for the first device 108a. The trust score 514 may be generated by the access control module 102b prior to generating the access permissions. If the difference between the domain score and the trust score 514 is acceptable (e.g., is within the resource threshold for that domain), the first device 108a may be assigned to that domain. As shown in the figure, the first device 108a may be assigned to the first domain 602a based on the first domain score 606a for the first domain 602a and the trust score 514. The first domain score 606a may be determined based on the sensitivity of the resources associated with the first domain 602a. In some instances, the first device 108a may be assigned to the VLAN V1. The identity management server 102 may transmit the access permissions for the first device 108a to the network device 104.

In step 7, the network device 104 may grant or deny the first device 108a access to the network 106 based on the access permissions. The access permissions may be in the form of an ACL. The access permissions may include various rules associated with the first device 108a. For example, the access permissions may include rules to permit access to other devices, to permit certain operations on given devices, etc.

Once the network connection has been granted to the first device 108a, the first device 108a may be able to access all the resources within its first domain 602a. In another instance, when the fifth device 108e sends a request to connect to the network 106, the network device 104 may forward the identity information for the fifth device 108e to the identity management server 102. The identity management server 102 may generate a trust score for the fifth device 108e, similar to the trust score 514 for the first device 108a, using the identity information, and the user information or the device information for the fifth device 108e. If the trust score for the fifth device 108e deviates from the trust score 514 for the first device 108a within certain acceptable limits, the identity management server 102 may assign the fifth device 108e to the first domain 602a. The fifth device 108e may be associated with the first user 116 or another user. For example, in one instance, the first device 108a may be a mobile phone and the fifth device 108e may be a laptop associated with the first user 116. In another instance, the first device 108a may be a mobile phone associated with the first user 116 and the fifth device 108e may be another mobile phone associated with a second user (not shown). The first user 116 and the second user may be employees of the same organization and the first device 108a and the fifth device 108e may belong to the same VLAN or different VLANs.

If the existing access permissions can be used for the fifth device 108e, the network device 104 may allow the fifth device 108e to connect to the network 106 using the existing access permissions. Otherwise, the identity management server 102 may update the access permissions for the first domain 602a to include the fifth device 108e and transmit the updated access permissions to the network device 104. The network device 104 may grant the fifth device 108e access to the network 106 based on the updated access permissions. According to the embodiments, the first device 108a and the fifth device 108e may have access to each other's resources by virtue of being in the same first domain 602a based on an access control matrix maintained by the identity management server 102. The identity management server 102 may be configured to maintain an access control matrix in the memory 130 to store access permissions for each device to communicate with other devices in the same domain or different domains. This is further explained with reference to FIG. 7.

FIG. 7 illustrates an access control matrix 700 configured to store access permissions for the devices for intra-domain access, according to certain embodiments of the disclosed technologies. The access control matrix 700 may include a source domain 702, a source VLAN 704, a destination VLAN 706, a destination domain 708 and an action tracker 710. In some implementations, the access control matrix 700 may be stored in the memory 130.

The source domain 702 may represent a domain to which the source device requesting the access belongs. The source VLAN 704 may represent a VLAN corresponding to the source domain 702, which the source device belongs to. The destination domain 708 may represent a domain to which the destination device belongs. The destination VLAN 706 may represent a VLAN corresponding to the destination domain 708, which the destination device belongs to. The action tracker 710 may represent the action granted by the identity management server 102. For example, the action may include "permit" or "deny." Note that other variations of the action tracker 710 are also possible, without deviating from the scope of the disclosed technologies. For example, in this specification, "permit", "allow" or "grant" may be used interchangeably.

The access control matrix 700 in FIG. 7 shows accesses between the devices belonging to the same domain (e.g., intra-domain access). According to certain embodiments, when the source domain 702 and the destination domain 708 correspond to the same domain, the devices may be allowed access to other devices within the same domain irrespective of the VLAN either device belongs to. As shown in FIG. 7, a source device belonging to any of the source VLANs V1, V2, or V3 in the first domain 602a (source domain 702) may be allowed access to a destination device belonging to any of the destination VLANs A V1, V2, or V3 in the first domain 602a (destination domain 708). Referring back to FIG. 6, based on the access control matrix 700, the first device 108a may have access to the resources 110e associated with the fifth device 108e, and the fifth device 108e may have access to the resources 110a associated with the first device 108a, automatically and without going through the authentication process.

Note that the access control matrix 700 shows the intra-domain access for the first domain 602a for simplicity purposes only. However, it will be understood that the access control matrices for each domain (e.g., second domain and the third domain) may be maintained by the identity management server 102. The access control matrices for all the domains may be part of one single access control matrix or may be individual matrices. Other implementations of the access control matrices are also possible without deviating from the scope of the disclosed technologies. Thus, according to certain embodiments, use of the access control matrix 700 to map the accesses between the domains for different devices can provide a scalable solution since the access control matrix 700 may be updated as new devices are added or existing devices are removed without interrupting the flow of packets in the system. The access permissions may be generated using the updated access control matrix 700 and updated on the network devices.

In some instances, a device may send a request to access resources in another domain, e.g., inter-domain access. According to certain embodiments, inter-domain accesses may require updating the access permissions generated by the identity management server 102. This is described in detail with reference to FIG. 8.

Figure 8:
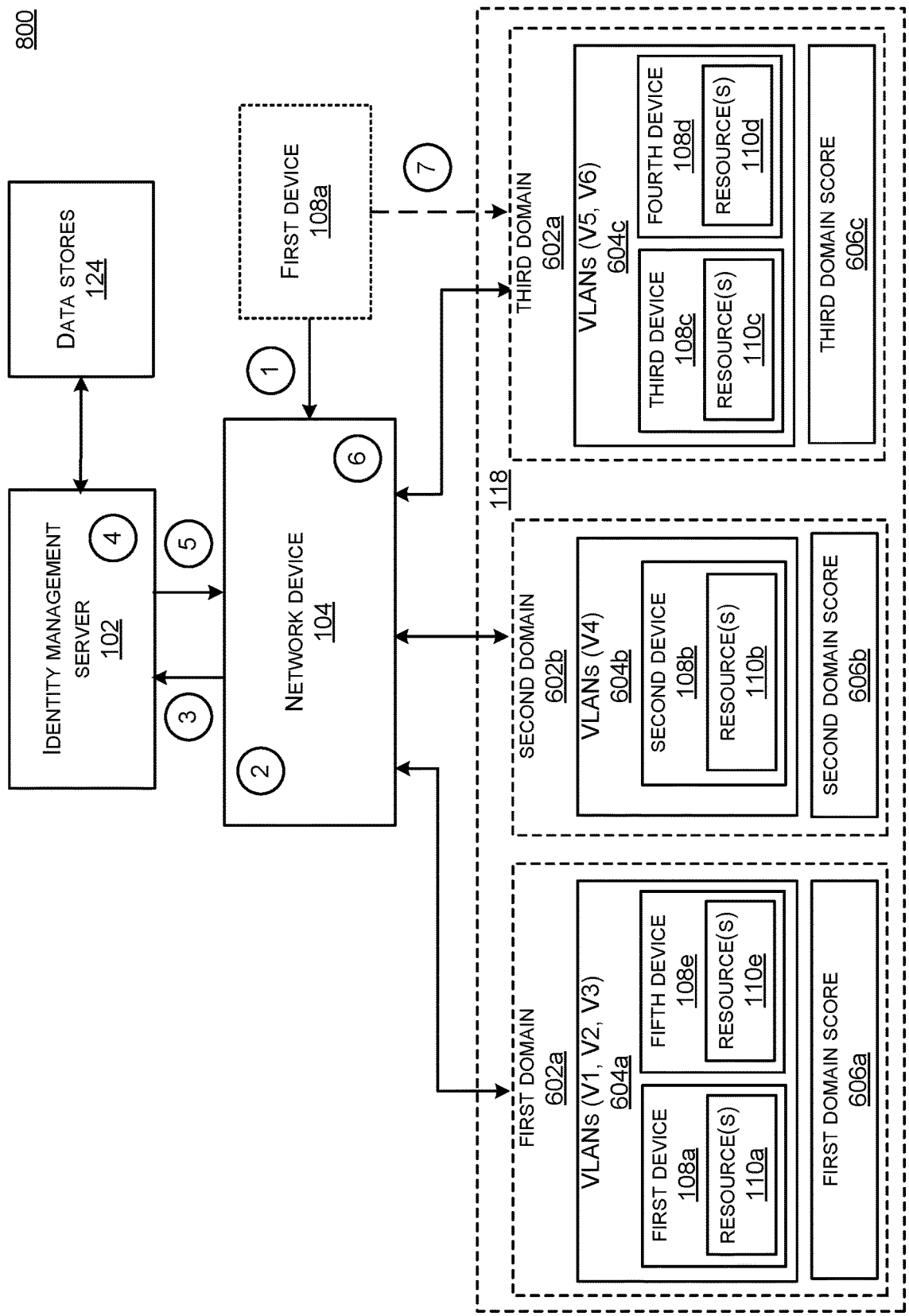
FIG. 8 illustrates a sequence of steps for a source device belonging to a first domain to request an inter-domain access to a destination device belonging to another domain, according to certain embodiments of the disclosed technologies.

FIG. 8 illustrates a sequence of steps for a source device belonging to a first domain to request an inter-domain access to a destination device belonging to another domain, according to certain embodiments of the disclosed technologies. For example, the source device may be the first device 108*a* belonging to the first domain 602*a* and the destination device may be the third device 108*d* belonging to the third domain 602*c*. Note that the first device 108*a* is shown with solid lines to illustrate that the first device 108*a* belongs to the first domain 602*a,* and is shown again with the dotted lines for ease of illustration to indicate an inter-domain access request initiated by the first device 108*a.*

In step 1, the first device 108*a* may send a request to the network device 104 to access the resources associated with the third device 108*c*. The request may include an IP packet or any other network packet based on the network protocol. The first device 108*a* may send the packet to the network device 104 via a wired or wireless communication channel. The first device 108*a* may include the first identification information 400 as discussed with reference to step 1 in FIG. 6.

In step 2, the network device 104 may process the packet received from the first device 108*a* to determine if the packet can be forwarded to the third device 108*c*. The network device 104 may parse the packet to extract the first identity information 400 of the first device 108*a*, a source address, and a destination address. For example, the source address may include a source VLAN address, and the destination address may correspond to a destination VLAN address. The network device 104 may determine whether the access permissions for the first device 108*a* to access the third device 108*c* are already available at the network device 104. If the access permissions are not available, the access may be denied by the network device 104 and the request may be directed to the identity management server 102.

In step 3, the network device 104 may forward the request received from the first device 108*a* to the identity management server 102. The request may include the source VLAN address and the destination VLAN address along with the first identity information 400. The identity management server 102 may be configured to determine that the first device 108*a* belongs to the first domain 602*a* based on the first identify information 400 for the first device 108*a* and/or the source VLAN address. Similarly, the identity management server 102 may be configured to determine that the third device 108*c* belongs to the third domain 602*c* based on the destination VLAN address. The identity management server 102 may access an access control matrix to generate access permissions for devices belonging to different domains. An access control matrix for inter-domain access is further explained with reference to FIG. 9.

FIG. 9 illustrates an access control matrix 900 configured to store access permissions for the devices for inter-domain access, in certain embodiments of the disclosed technologies. The access control matrix 900 may include a source domain 902, a destination domain 904 and an action tracker 906. In certain implementations, the access control matrix 900 may be stored in the memory 130. In various embodiments, the access control matrix 700 used for intra-domain accesses and the access control matrix 900 used for inter-domain accesses may be part of the same data structure or different data structures based on the implementation.

The source domain 902 may represent a domain to which the source device requesting the access belongs. As an example, the first device 108*a* (e.g., source device) requesting the access to the third device 108*c* (e.g., destination device) may belong to the first domain 602*a*. The source device may belong to any of the VLANs associated with the source domain 902. Referring back to FIG. 8, the first device 108*a* may belong to the VLAN V1 associated with the first domain 602*a*. The destination domain 904 may represent a domain to which the destination device belongs. As an example, the third device 108*c* may belong to the third domain 602*c*. Referring back to FIG. 8, the third device 108*c* may belong to the VLAN V5 associated with the third domain 602*c*. The action tracker 906 may represent the action granted by the identity management server 102. For example, the action may include "allow" or "deny." Note that other variations of the action tracker 906 are possible without deviating from the scope of the disclosed technologies.

Continuing with FIG. 8, in step 4, the identity management server 102 may process the request received from the network device 104. As discussed with reference to step 4 in FIG. 6, the identity management server 102 may access, from the data stores 124, the user profile 126 of the first user 116 associated with the first device 108*a* using the first identity information 400 from the request. The identity management server 102 may authenticate the first user 116 associated with the first device 108*a* using the past behavior information 126*b* for the first user 116 from the user profile 126. As discussed with reference to step 5 in FIG. 6, in some embodiments, the identity management server 102 may present a set of challenge questions to the first device 108*a,* and based on the response to the set of challenge questions from the first device 108*a,* the identity management server 102 may validate the identity of the first user 116. In certain embodiments, the set of challenge questions and an expected response to each set of challenge questions may be unique over a period of time. The identity management server 102, upon authenticating the identity of the first user 116, may update the access permissions for the first device 108*a* based on the membership of the first device 108*a* to the first domain 602*a* and of the third device 108*c* to the third domain 602*c*. For example, the identity management server 102 may update the access permissions allowing accesses between the devices belonging to the first domain 602*a* and the third domain 602*c,* if the access control matrix 900 allows accesses between the two domains.

In step 5, the identity management server 102 may transmit the updated access permissions to the network device 104 in response to the packet received from the first device 108*a* for access to the third device 108*c*. The updated access permissions may be installed on the network device 104.

In step 6, the network device 104 may grant access to the first device 108*a* belonging to the first domain 602*a* to communicate with the third device 108*c* belonging to the third domain 602*c* based on the updated access permissions.

In step 7, the first device 108*a* belonging to the VLAN V1 in the first domain 602*a* may connect to the third device 108*c* belonging to the VLAN V5 that is assigned to the third domain 602*c*. Thus, the first device 108*a* may have access to the resource 110*c* associated with the first domain 602*a,* and the third device 108*c* may have access to the resources 110*a* associated with the first domain 602*a.*

In certain embodiments, as will be described in greater detail below, all subsequent requests from the devices belonging to the first domain 602a will have access permissions to the devices belonging to the third domain 602c via the network device 104 as long as the access permissions reside on the network device 104 and can allow such access. However, in certain embodiments, since all access permissions stored on the network device 104 may be temporal and periodically updated or removed, such inter-domain accesses may be temporary and periodically updated or removed as well, thus avoiding stale inter-domain accesses from creating security gaps in the network 106.

Figure 10:
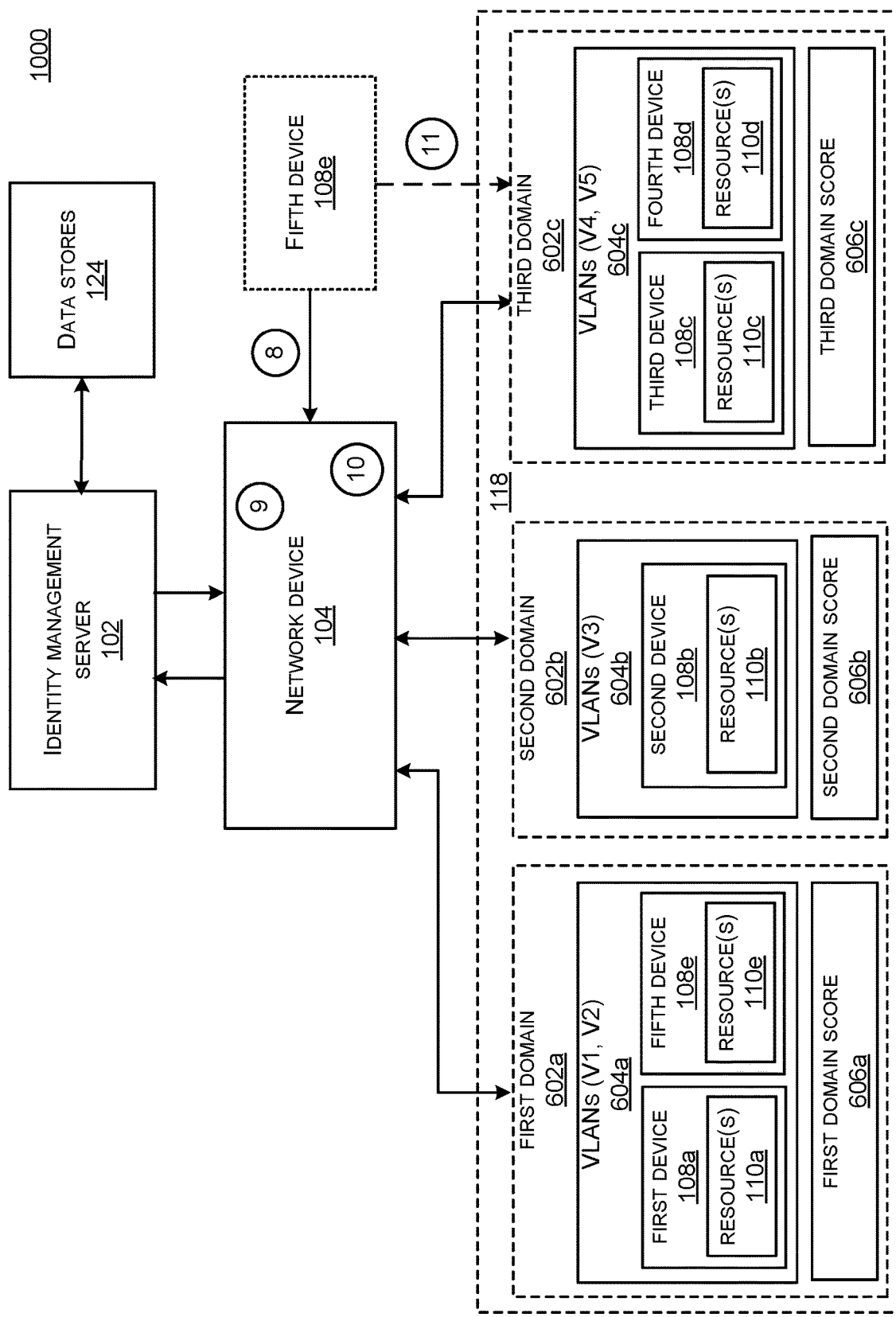
FIG. 10 illustrates a sequence of steps for processing a subsequent request from another device after the first request from the first device for the inter-domain access using the identity management server is processed, according to certain embodiments of the disclosed technologies.

FIG. 10 illustrates a system 1000 for processing a subsequent request from another device after the first request from the first device 108a for the inter-domain access using the identity management server 102 is processed, according to certain embodiments of the disclosed technologies. For example, the subsequent request may be generated by the fifth device 108e belonging to the first domain 602a to access the third device 108c belonging to the third domain 602c after the step 7 in FIG. 8 when the request from the first device 108a to access the third device 108c was granted.

In step 8, the fifth device 108e may send another packet to the network device 104 comprising an access request to the third device 108c belonging to the third domain 602c. The network access request may be a subsequent request to the request as discussed with reference to FIG. 8.

In step 9, the network device 104 may process the request received from the fifth device 108e. The network device 104 may determine whether the access permissions for the first domain 602a available to the network device 104 can allow granting the fifth device 108e access to the third device 108c. According to certain embodiments, if the trust score for the fifth device 108e deviates from the trust score 514 for the first device 108a within certain acceptable limits, the identity management server 102 may not need to authenticate the fifth device 108e, and the access permissions for the first domain 602a may not be updated.

In step 10, the network device 104 may grant access to the fifth device 108e to communicate with the third device 108c based on the access permissions already installed on the network device 104 for inter-domain accesses between the devices of the first domain 602a and the third domain 602c.

In step 11, the fifth device 108e belonging to the first domain 602a may connect to the third device 108c belonging to the third domain 602c. The fifth device 108e may have access to the resources associated with the third domain 602c. Thus, in another instance, if the first device 108a or the fifth device 108e sends another request to communicate with the fourth device 108d, the network device 104 may grant the request using the available access permissions for the third domain 602c.

In some instances, the access permissions may need to be renewed, updated, invalidated or removed for a number of reasons, such as security management related events, device feature upgrades, bug-fixes, etc. Some embodiments of the disclosed technologies can allow periodic re-authorization of the access permissions by the identity management server 102 to renew, update or remove the access permissions for the one or more devices. This is further explained with reference to FIG. 11.

Figure 11:
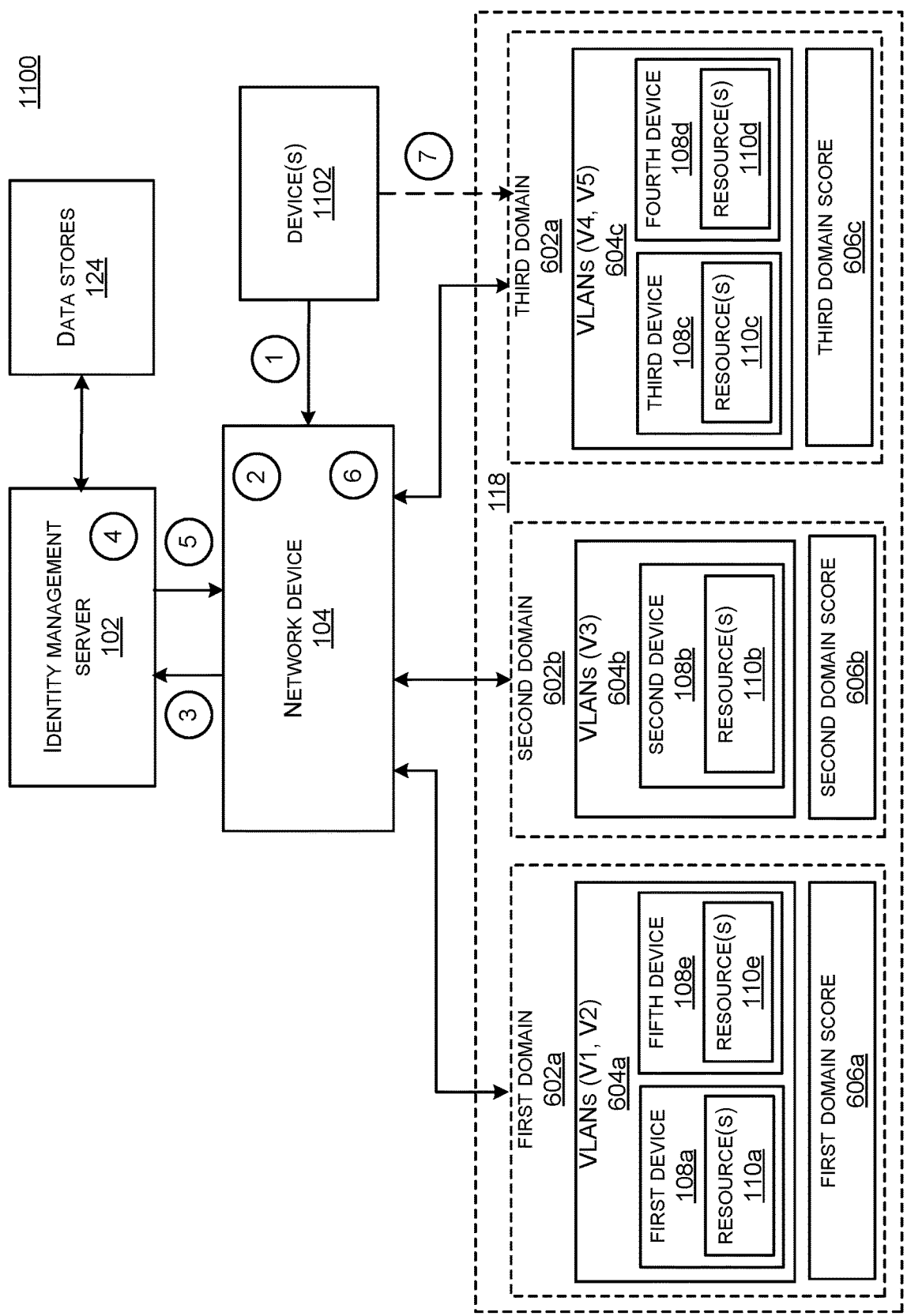
FIG. 11 illustrates a system for reauthorizing access permissions for inter-domain and intra-domain accesses using the identity management server, according to certain embodiments of the disclosed technologies.

FIG. 11 illustrates a system 1100 for reauthorizing access permissions for inter-domain and intra-domain accesses using the identity management server 102, according to certain embodiments of the disclosed technologies.

In step 1, a source device from the devices 1102 may send a packet comprising the network connection request to the network device 104 for communication with a destination device. The source device may belong to a source VLAN and the destination device may belong to a destination VLAN. The source VLAN and the destination VLAN may belong to the same domain (intra-domain access) or different domains (inter-domain access) as discussed with reference to FIG. 8 and FIG. 10. The devices 1102 may include devices trying to connect to the network 106, or to other devices that are on the network 106.

In step 2, the network device 104 may process the packet received from the source device. In certain embodiments, a request from any of the devices 1102 may be forwarded to the identity management server 102 for re-authorization even if the request is not the first request by the device. The network device 104 may be configured to trap requests from the devices 1102 periodically or at fixed intervals (e.g., 30 minutes intervals, 2 hour intervals or 18 hours intervals) and forward the request to the identity management server 102 for re-authorization even if the access permissions for the devices 1102 are already installed at the network device 104.

In step 3, the network device 104 may forward the request from the source device to the identity management server 102. The network device 104 may provide the source VLAN, the destination VLAN and the identity information for the source device to the identity management server 102. The identity information may be similar to the first identity information 400.

In step 4, the identity management server 102 may verify the identity of the user associated with the source device using the identity information received in the packet and the user profile stored in the data stores 124. The user profile may be similar to the user profile 126. The identity management server 102 may also validate if the user associated with the first device is still authorized for network access. For example, the identity management server 102 may validate the user using another set of challenge questions and expected response. In some instances, the identity management server 102 may also recalculate the trust score and compare with the trust score stored at the server to rule out any man-in-the-middle attacks. The identity management server 102 may further determine if the access permissions were previously installed on the network device 104 to grant access and whether the access permissions need to be updated, renewed, invalidated, or removed. For example, the access permissions may need to be renewed, updated, invalidated, or removed due to security management related events, device feature upgrades, bug-fixes, or any other relevant reason. The identity management server 102 may generate updated access permissions for the source device if the user for the source device has been re-authorized and the access permissions need to be renewed or updated. The identity management server 102 may generate the updated access permissions using the updated access control matrix (e.g., the access control matrix 700 or the access control matrix 900) which may have been reconfigured to reflect the mapping of the devices to the domains. In some instances, the identity management server 102 may determine that the access permissions between certain devices need to be removed, e.g., the user for the source device has failed the re-authorization.

In step 5, the identity management server 102 may send a response packet to the network device 104 for the request. The identity management server 102 may send the updated access permissions to be re-installed on the network device 104 if the source device was reauthorized for access. Alternatively, the identity management server 102 may indicate in the response packet to the network device 104 to remove the access permissions if the source device was not reauthorized for access.

In step 6, the network device 104 may grant or deny the access to the destination device based on the response from the identity management server 102. For example, the access may be granted using the updated or renewed access permissions, or denied due to the removal of the access permissions. Thus, the access permissions can be updated or removed periodically based on the updates of the access controls grids as configured by the identity management server 102.

In step 7, the source device may connect to the destination device if the access was granted by the network device 104. Thus, certain embodiments can reduce ambiguity and uncertainty associated with the access permissions by having a centralized mechanism to periodically update and remove the rules for the access permissions.

In some instances, an update to the access permissions may permit the network device 202 to transmit a second packet received from the source device to another destination device based on the update to the access permissions. For example, the update can allow access between devices of different domains.

In addition, in combination with or as an alternative to the techniques disclosed above with reference to FIG. 11, in certain embodiments, the identity management server 102 may proactively and periodically renew, update, invalidate or delete access permissions on each of the network devices. The identity management server 102 may maintain and update access permissions for the network device 104 in its own memory and periodically update the access permissions on the network device 104 by sending messages to the network device 104, causing the network device 104 to overwrite all or portions of the access permissions stored on the network device 104 with the access permissions provided by the identity management server 102. This may enforce the process by which that access permissions are aged off of the network device 104 periodically. Such a policy may further avoid build-up of stale access permissions over time on a network device that contributes to the complexity and overhead of maintaining access permissions.

Figure 12:
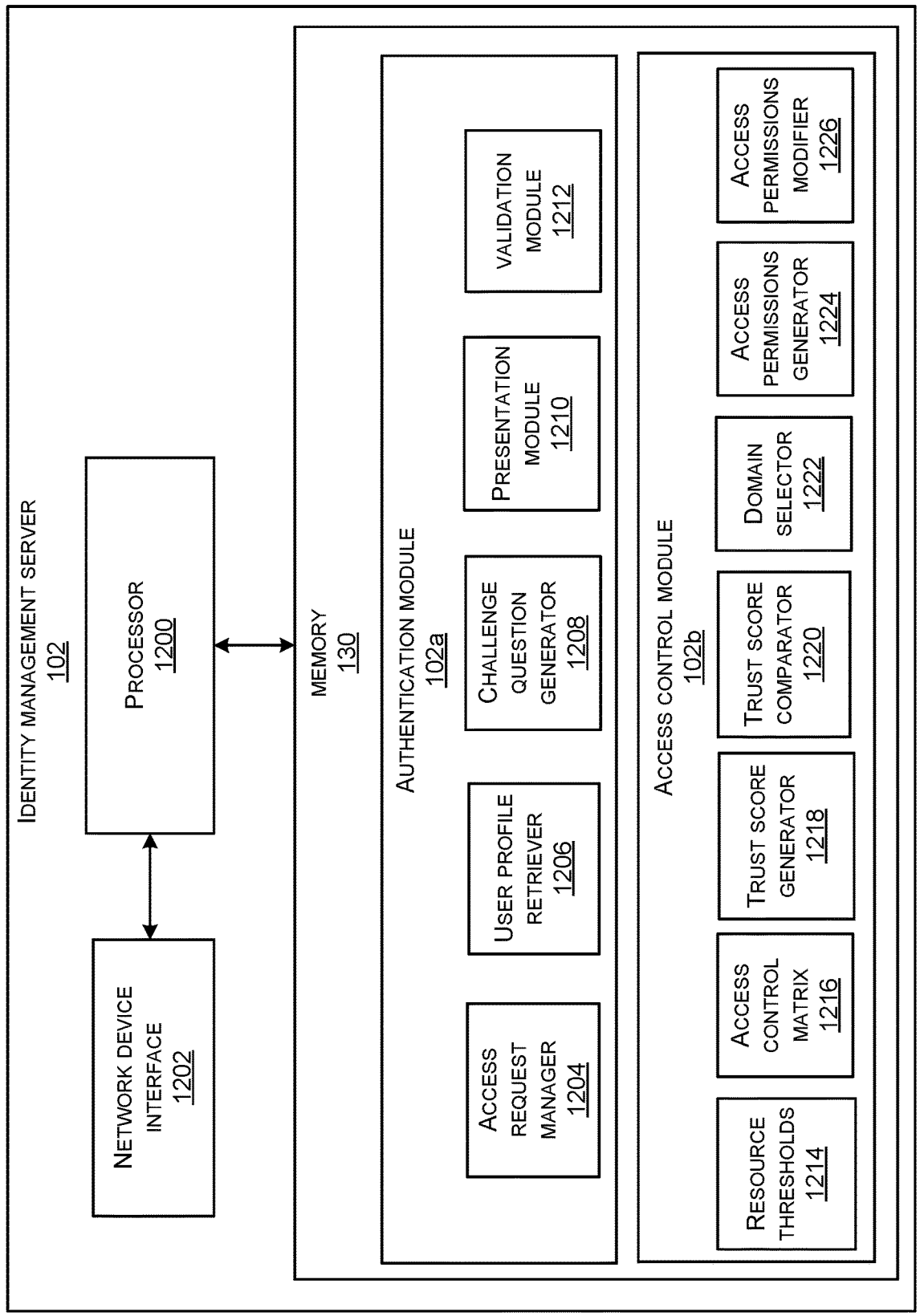
FIG. 12 illustrates a block diagram of the identity management server, in one embodiment of the disclosed technologies.

FIG. 12 illustrates a block diagram of the identity management server 102, in one embodiment of the disclosed technologies.

The identity management server 102 may include a processor 1200 coupled to a network device interface 1202 and the memory 130. The memory 130 may include the authentication module 102a and the access control module 102b. In some embodiments, the memory 130 may also include the data stores 124. The authentication module 102a may include an access request manager 1204, a user profile retriever 1206, a challenge question generator 1208, a presentation module 1210, and a validation module 1212. The access control module 102b may include resource thresholds 1214, an access control matrix 1216, a trust score generator 1218, a trust score comparator 1220, a domain selector 1222, an access permissions generator 1224, and an access permissions modifier 1226.

The processor 1200 may include one or more processing cores that may be configured to execute a plurality of instructions. The instructions may be stored in the memory 130, for example, in the form of a computer program. The memory 130 may be internal or external to the identity management server 102. In some instances, the memory 130 may include, e.g., RAM, ROM, Electrically Erasable Programmable Read-Only Memory (EEPROM), flash memory or any suitable storage media. In some implementations, the identity management server 102 may include an x86 CPU platform, e.g., Xeon, Pentium, Atom, Athlon, etc.

The network device interface 1202 may be configured to allow communications between the network device 104 and the identity management server 102 based on a certain network protocol. For example, the network device interface 1202 may be configured to receive and transmit packets between the network device 104 and the identity management server 102. The network device interface 1202 may include a wired or a wireless connection to the network device 104.

The access request manager 1204 may be configured to manage the access requests received from various devices via the network device 104. For example, the access request manager 1204 may be configured to process a packet sent by the network device 104 for a request initiated by a device to connect to the network 106. For example, the access request manager 1204 may be configured to parse the packet to determine identification information for the device. The identification information may be similar to the first identity information 400. The access request manager 1204 may also be configured to determine a source VLAN and a destination VLAN if the request is for connecting to another device.

The user profile retriever 1206 may be configured to retrieve a profile of the user based on the identification information provided in the request. For example, the user profile may be similar to the user profile 126. The user profile may be used to determine past behavior information of a user associated with the device. The past behavior information may be stored based on the user's recent purchases or search history using the user's cloud based device.

The challenge question generator 1208 may be configured to generate a plurality of sets of challenge questions for the user of the device. The challenge question generator 1208 may also be configured to generate a respective expected response from the device to each set of challenge questions. Each set of challenge questions for the user from the past behavior information of the user, and the respective expected response can be dynamically generated. Each set of challenge questions and an expected response can be unique over a period of time. In some embodiments, the set of challenge questions and the expected response may be determined using a machine learning model based on the past behavior information associated with the user.

The presentation module 1210 may be configured to present the set of challenge questions to the device which initiated the request. In some embodiments, a secure communication channel may be established between the identity management server 102 and the device to present the set of challenge questions to the user and to receive a response from the device.

The validation module 1212 may be configured to validate the identity of the user based on the response to the set of challenge questions from the device and the expected response.

The resource thresholds 1214 may represent thresholds for respective domains scores associated with each domain maintained by the identity management server 102. For example, the resource thresholds 1214 may correspond to the first domain score 606a associated with the first domain 602a, the second domain score 606b associated with the second domain 602b, and third domain score 606c associated with the third domain 602c. The resource thresholds 1214 may be programmed by a host device or a system administrator. The resource thresholds 1214 may be used to implement access controls for different domains.

The access control matrix 1216 may include access control matrices for different domains for inter-domain and intra-domain accesses. The access control matrix 1216 may be similar to the access control matrix 700 or the access control matrix 900 as described with reference to FIG. 7 and FIG. 9. The access control matrix 1216 may be implemented using separate data structures for inter-domain accesses and intra-domain accesses, or a single data structure. Note that other implementations are also possible without deviating from the scope of the disclosed technologies.

The trust score generator 1218 may be configured to generate the trust score for the device. The trust score may be similar to the trust score 514. The trust score generator 1218 may generate the trust score of the device by categorizing the identity information, and the user information for the user of the device or the device information for the device into various categories and generating composite scores from the different categories.

The trust score comparator 1220 may be configured to compare the trust score generated for the device with a domain score associated with a domain. For example, the trust score comparator 1220 may compare the trust score generated for the device with the domain score associated with the domain to determine if the difference is within the respective resource threshold for that domain. If the difference is within the respective resource threshold for that domain, access to that domain may be allowed.

The domain selector 1222 may be configured to select a domain for the device requesting the access. The domain selector 1222 may select the domain based on the comparison of the trust score with the domain score associated with the domain.

The access permissions generator 1224 may be configured to generate the access permissions for a device belonging to a domain or across domains based on the request. The access permissions generator 1224 may generate the access permissions based on the access control matrix 1216. For example, the access permissions may specify the devices that are allowed (based on the action tracker 710 or the action tracker 906) for inter-domain or intra-domain accesses. In certain embodiments, the access permissions may be in the form of an access control list.

The access permissions modifier 1226 may be configured to modify the access permissions already installed on the network device 104. For example, modifying the access permissions may include renewing, updating, invalidating, or removing the access permissions for a device. The access permissions modifier 1226 may modify the access permissions periodically or at a regular interval (e.g., every 15 minutes, every 30 minutes, every 2 hours, every 24 hours, etc.). In certain embodiments, the access permissions modifier 1226 may modify the access permissions when a request to generate the access permissions is received from the network device 104. The modified access permissions may be transmitted to be re-installed at the network device 104 using the network device interface 1202. In some instances, an update to the access permissions may permit the network device 104 to transmit a second packet received from the source device to another destination device based on the update to the access permissions, which can allow access between devices of the source domain and the destination domain.

Figure 13:
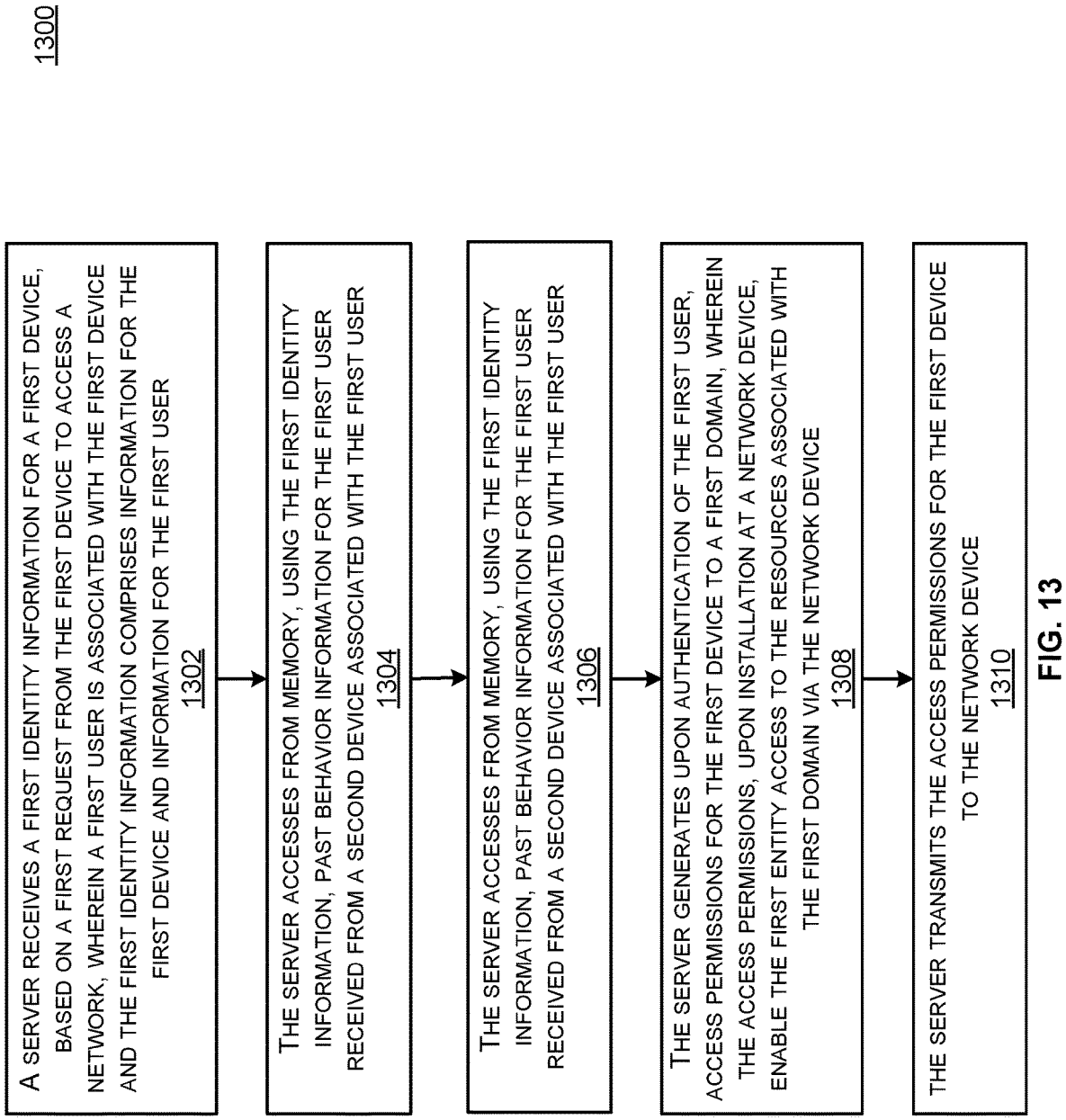
FIG. 13 shows a method executed by the identity management server, in certain embodiments of the disclosed technologies.

FIG. 13 shows a method executed by a server, in certain embodiments of the disclosed technologies. In certain embodiments, the method may be performed by software, firmware, hardware or any combination thereof. Furthermore, portions of the method executed by software and/or firmware may be executed on a processor by loading instructions into the processor from a non-transitory computer-readable medium. The server may be the identity management server 102, as discussed with reference to FIG. 1.

In step 1302, the identity management server 102 may receive a first identity information for a first device, based on a first request from the first device to access a network. A first user may be associated with the first device and the first identity information may comprise information for the first device and information for the first user. For example, the first device may be the first device 108a of FIG. 1. The request may be received from the network device 104 for a network connection request initiated by the first device 108a to access the network 106.

In step 1304, the identity management server 102 may access, using the first identity information, past behavior information for the first user received from a second device associated with the first user. The identity management server 102 may retrieve the user profile 126 using the first identity information 400. The user profile 126 may store past behavior information of the first user 116 which may be received from the second device, such as a cloud-based device 118.

In step 1306, the identity management server 102 may authenticate the first user using the past behavior information for the first user. In some embodiments, the authentication module 102a may authenticate the first user 116 by dynamically generating a set of challenge questions based on the past behavior information of the first user 116. The identity management server 102 may present the set of challenge questions to the first user 116 and based on the response from the first device 108a, the first user 116 may be authenticated.

In step 1308, the identity management server 102 may generate, upon authentication of the first user, access permissions for the first device to a first domain. The access permissions, upon installation at a network device, may enable the first entity access to the resources associated with the first domain via the network device. In some embodiments, prior to generating the access permissions, the access control module 102b may also generate the trust score 514 for the first device 108a using the attributes from the information associated with the first device 108a and the first user 116. The access control module 102b may compare the trust score 514 of the first device 108a with first domain score 606a for the first domain 602a and generate the access permissions if the trust score 514 is within the first resource threshold from the resource thresholds. The first domain score 606a may be based on the sensitivity level of the resources 110a and 110e associated with the first domain 602a.

In step 1310, the identity management server 102 may transmit the access permissions for the first domain using the network device interface 1202. The network device 104 may use the access permissions to grant the access to the first device 108a to the resources associated with the first domain 602a.

Embodiments of the disclosed technologies can utilize a centralized identity management server to provide built-in updates and maintenance of the access permissions among devices using automatic authentication of the users of the devices based on events occurring in the network and mapping to the access controls implemented at the network device level. Non-traditional authentication factors, which can be changed dynamically, may be used for authentication based on the user's past behavior information. By dynamically generating the challenge questions and expected answers, which may be unique, based on the user's past behavior information, certain embodiments can provide a more robust and secure method for user authentication as compared to authentication methods using traditional factors that may not change for a long period of time and thus will be more prone to unauthorized access. The identity based management of the access permissions can further allow a robust and secure approach for network access control. Certain embodiments can allow integration with different cloud devices with minimal changes to the infrastructure.

Figure 14:
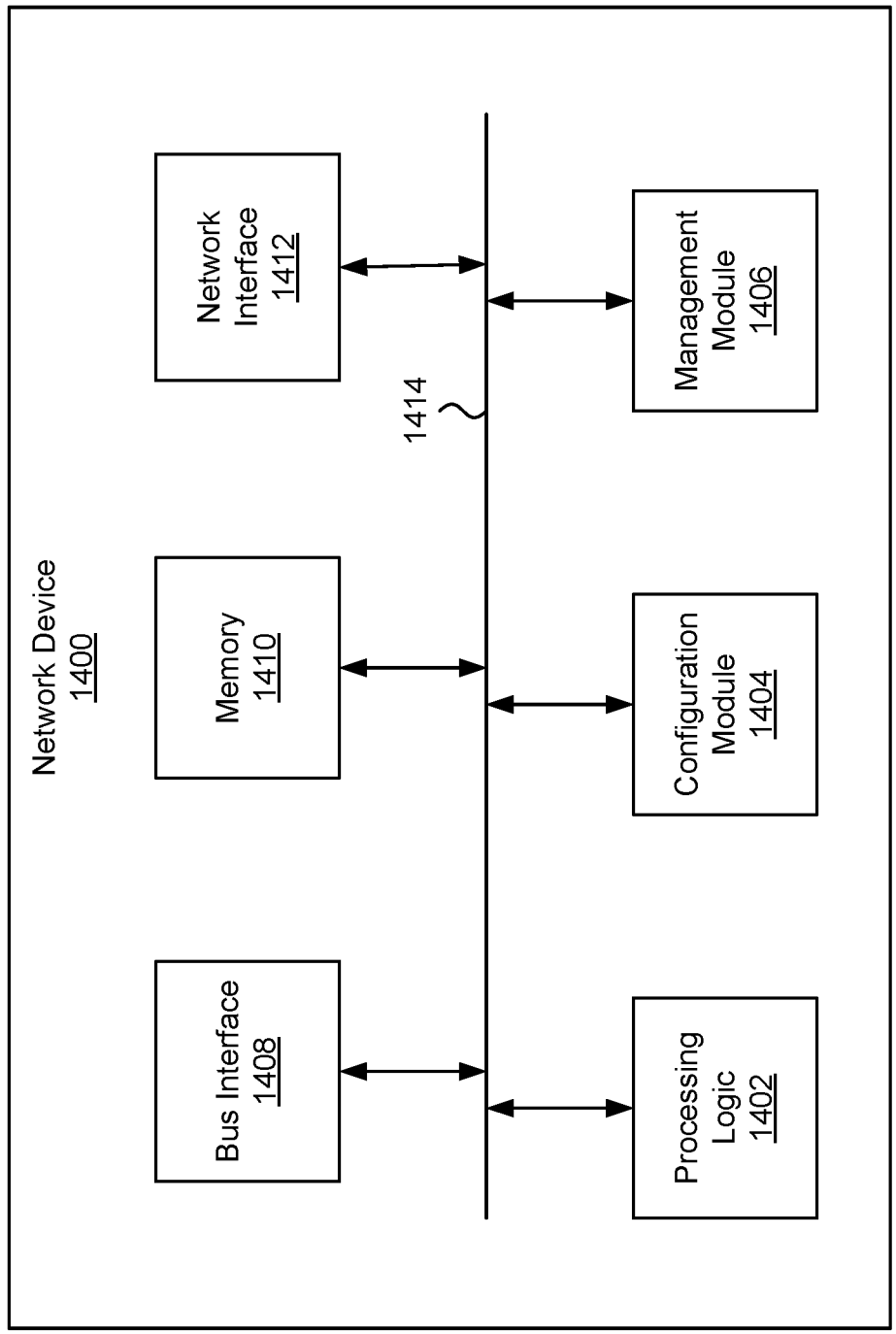
FIG. 14 illustrates an example of a network device, according to certain aspects of the disclosure.

FIG. 14 illustrates an example of a network device 1400. Functionality and/or several components of the network device 1400 may be used without limitation with other embodiments disclosed elsewhere in this disclosure, without limitations. For example, the network device 1400 may be similar to the network device 104 of FIG. 1. The network device 1400 may facilitate processing of packets and/or forwarding of packets from the network device 1400 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1400 may be the recipient and/or generator of packets. In some implementations, the network device 1400 may modify the contents of the packet before forwarding the packet to another device. The network device 1400 may be a peripheral device coupled to another computer device, a switch, a router or any other suitable device enabled for receiving and forwarding packets.

In one example, the network device 1400 may include processing logic 1402, a configuration module 1404, a management module 1406, a bus interface module 1408, memory 1410, and a network interface module 1412. These modules may be hardware modules, software modules, or a combination of hardware and software. In certain instances, modules may be interchangeably used with components or engines, without deviating from the scope of the disclosure. The network device 1400 may include additional modules, not illustrated here, such as components discussed with respect to the nodes disclosed in FIG. 15. In some implementations, the network device 1400 may include fewer modules. In some implementations, one or more of the modules may be combined into one module. One or more of the modules may be in communication with each other over a communication channel 1414. The communication channel 1414 may include one or more busses, meshes, matrices, fabrics, a combination of these communication channels, or some other suitable communication channel.

The processing logic 1402 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1402 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1402 may be stored on a computer-readable storage medium, for example, in the form of a computer program. The computer-readable storage medium may be non-transitory. In some cases, the computer-readable medium may be part of the memory 1410.

The memory 1410 may include either volatile or non-volatile, or both volatile and non-volatile types of memory. The memory 1410 may, for example, include random access memory (RAM), read only memory (ROM), Electrically Erasable Programmable Read-Only Memory (EEPROM), flash memory, and/or some other suitable storage media. In some cases, some or all of the memory 1410 may be internal to the network device 1400, while in other cases some or all of the memory may be external to the network device 1400. The memory 1410 may store an operating system comprising executable instructions that, when executed by the processing logic 1402, provides the execution environment for executing instructions providing networking functionality for the network device 1400. The memory may also store and maintain several data structures and routing tables for facilitating the functionality of the network device 1400.

In some implementations, the configuration module 1404 may include one or more configuration registers. Configuration registers may control the operations of the network device 1400. In some implementations, one or more bits in the configuration register can represent certain capabilities of the network device 1400. Configuration registers may be programmed by instructions executing in the processing logic 1402, and/or by an external entity, such as a host device, an operating system executing on a host device, and/or a remote device. The configuration module 1404 may further include hardware and/or software that control the operations of the network device 1400.

In some implementations, the management module 1406 may be configured to manage different components of the network device 1400. In some cases, the management module 1406 may configure one or more bits in one or more configuration registers at power up, to enable or disable certain capabilities of the network device 1400. In certain implementations, the management module 1406 may use processing resources from the processing logic 1402. In other implementations, the management module 1406 may have processing logic similar to the processing logic 1402, but segmented away or implemented on a different power plane than the processing logic 1402.

The bus interface module 1408 may enable communication with external entities, such as a host device and/or other components in a computing system, over an external communication medium. The bus interface module 1408 may include a physical interface for connecting to a cable, socket, port, or other connection to the external communication medium. The bus interface module 1408 may further include hardware and/or software to manage incoming and outgoing transactions. The bus interface module 1408 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1408 may include the physical layer for any of these bus protocols, including a connector, power management, and error handling, among other things. In some implementations, the network device 1400 may include multiple bus interface modules for communicating with multiple external entities. These multiple bus interface modules may implement the same local bus protocol, different local bus protocols, or a combination of the same and different bus protocols.

The network interface module 1412 may include hardware and/or software for communicating with a network. This network interface module 1412 may, for example, include physical connectors or physical ports for wired connection to a network, and/or antennas for wireless communication to a network. The network interface module 1412 may further include hardware and/or software configured to implement a network protocol stack. The network interface module 1412 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1400 may include multiple network interface modules, each configured to communicate with a different network. For example, in these implementations, the network device 1400 may include a network interface module for communicating with a wired Ethernet network, a wireless 802.11 network, a cellular network, an Infiniband network, etc.

The various components and modules of the network device 1400, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 15.

Figure 15:
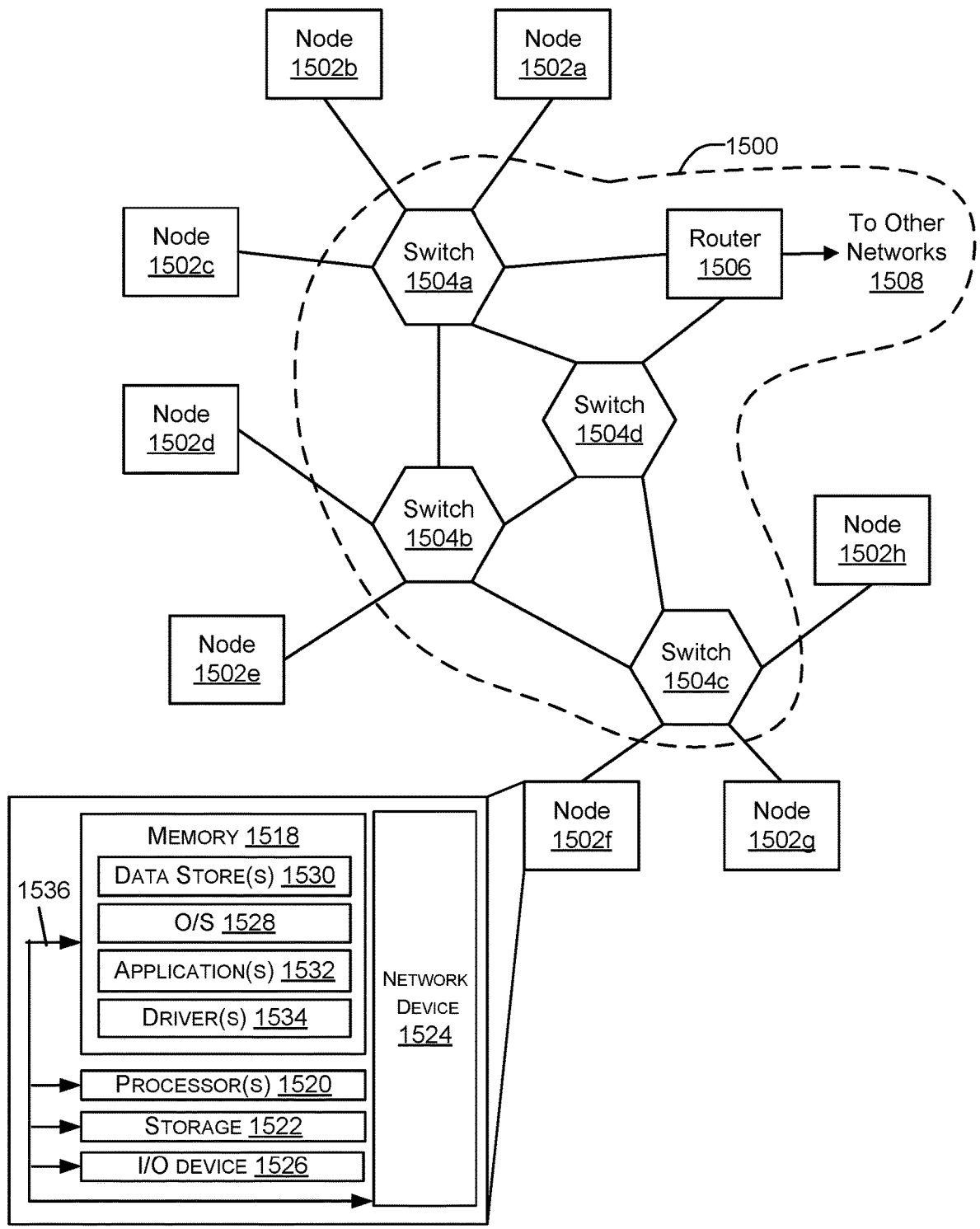
FIG. 15 illustrates an example architecture for features and systems described herein that include one or more service provider computers and/or a user device connected via one or more networks, according to certain aspects of the disclosure.

FIG. 15 illustrates a network 1500, illustrating various different types of network devices 1400 of FIG. 14, such as nodes comprising the network device, switches and routers. In certain embodiments, the network 1500 may be based on a switched architecture with point-to-point links. As illustrated in FIG. 15, the network 1500 includes a plurality of switches 1504*a*-1504*d*, which may be arranged in a network. In some embodiments, the plurality of switches 1504*a*-1504*d* may be similar to the network device 202 as discussed with reference to FIG. 2 to FIG. 12. In some cases, the switches are arranged in a multi-layered network, such as a Clos network. A network device 1400 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1504*a*-1504*d* may be connected to a plurality of nodes 1502*a*-1502*h* and provide multiple paths between any two nodes.

The network 1500 may also include one or more network devices 1400 for connection with other networks 1508, such as other subnets, LANs, wide area networks (WANs), or the Internet, and may be referred to as routers 1506. Routers use headers and forwarding tables to determine the best path for forwarding the packets, and use protocols such as internet control message protocol (ICMP) to communicate with each other and configure the best route between any two devices.

In some examples, network(s) 1500 may include any one or a combination of many different types of networks, such as cable networks, the Internet, wireless networks, cellular networks and other private and/or public networks. Interconnected switches 1504*a*-1504*d* and router 1506, if present, may be referred to as a switch fabric, a fabric, a network fabric, or simply a network. In the context of a computer network, terms "fabric" and "network" may be used interchangeably herein.

Nodes 1502*a*-1502*h* may be any combination of host systems, processor nodes, storage subsystems, and I/O chassis that represent user devices, service provider computers or third party computers. In some embodiments, each of the nodes 1502*a*-1502*h* may include functionality of the management server 204.

User devices may include computing devices to access an application 1532 (e.g., a web browser or mobile device application). In some aspects, the application 1532 may be hosted, managed, and/or provided by a computing resources service or service provider. The application 1532 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1508. Additionally, the user device(s) may be part of the distributed system managed by, controlled by, or otherwise part of the service provider computer(s) (e.g., a console device integrated with the service provider computers).

The node(s) of FIG. 15 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1532 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1502a-1502h may include at least one memory 1518 and one or more processing units (or processor(s) 1520). The processor(s) 1520 may be implemented in hardware, computer-executable instructions, firmware, or combinations thereof. Computer-executable instruction or firmware implementations of the processor(s) 1520 may include computer-executable or machine-executable instructions written in any suitable programming language to perform the various functions described.

In some instances, the hardware processor(s) 1520 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1518 may store program instructions that are loadable and executable on the processor(s) 1520, as well as data generated during the execution of these programs. Depending on the configuration and type of the node(s) 1502a-1502h, the memory 1518 may be volatile (such as RAM) and/or non-volatile (such as ROM, flash memory, etc.). The memory 1518 may include an operating system 1528, one or more data stores 1530, one or more application programs 1532, one or more drivers 1534, and/or services for implementing the features disclosed herein. For example, the program instructions stored in the memory 1518 may include code for executing the functionality of the authentication module 102a and the access control module 102b.

The operating system 1528 may support nodes 1502a-1502h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1528 may also be a proprietary operating system.

The data stores 1530 may include permanent or transitory data used and/or operated on by the operating system 1528, application programs 1532, or drivers 1534. Examples of such data include web pages, video data, audio data, images, user data, and so on. The information in the data stores 1530 may, in some implementations, be provided over the network(s) 1508 to user devices 1504. In some cases, the data stores 1530 may additionally or alternatively include stored application programs and/or drivers. Alternatively or additionally, the data stores 1530 may store standard and/or proprietary software libraries, and/or standard and/or proprietary application user interface (API) libraries. Information stored in the data stores 1530 may be machine-readable object code, source code, interpreted code, or intermediate code. The data stores 1530 may be similar to the data stores 124.

The drivers 1534 include programs that may provide communication between components in a node. For example, some drivers 1534 may provide communication between the operating system 1528 and additional storage 1522, network device 1524, and/or I/O device 1526. Alternatively or additionally, some drivers 1534 may provide communication between application programs 1532 and the operating system 1528, and/or application programs 1532 and peripheral devices accessible to the service provider computer. In many cases, the drivers 1534 may include drivers that provide well-understood functionality (e.g., printer drivers, display drivers, hard disk drivers, Solid State Device drivers). In other cases, the drivers 1534 may provide proprietary or specialized functionality.

The service provider computer(s) or servers may also include additional storage 1522, which may include removable storage and/or non-removable storage. The additional storage 1522 may include magnetic storage, optical disks, solid state disks, flash memory, and/or tape storage. The additional storage 1522 may be housed in the same chassis as the node(s) 1502a-1502h or may be in an external enclosure. The memory 1518 and/or additional storage 1522 and their associated computer-readable media may provide non-volatile storage of computer-readable instructions, data structures, program modules, and other data for the computing devices. In some implementations, the memory 1518 may include multiple different types of memory, such as SRAM, DRAM, or ROM.

The memory 1518 and the additional storage 1522, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1518 and the additional storage 1522 are examples of computer storage media. Additional types of computer storage media that may be present in the node(s) 1502a-1502h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1502a-1502h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1502a-1502h may also include I/O device(s) 1526, such as a keyboard, a mouse, a pen, a voice input device, a touch input device, a display, speakers, a printer, and the like. The node(s) 1502a-1502h may also include one or more communication channels 1536. A communication channel 1536 may provide a medium over which the various components of the node(s) 1502a-1502h can communicate. The communication channel or channels 1536 may take the form of a bus, a ring, a switching fabric, or a network.

The node(s) 1502a-1502h may also contain network device(s) 1524 that allow the node(s) 1502a-1502h to communicate with a stored database, another computing device or server, user terminals and/or other devices on the network(s) 1500. The network device(s) 1524 of FIG. 15 may include similar components discussed with reference to the network device 1400 of FIG. 14.

In some implementations, the network device 1524 is a peripheral device, such as a PCI-based device. In these implementations, the network device 1524 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1408 may implement NVMe, and the network device 1524 may be connected to a computing system using a PCIe interface.

A PCI-based device may include one or more functions. A "function" describes operations that may be provided by the network device 1524. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1524 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 14, FIG. 15, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   a plurality of user devices coupled to a network device;
   an identity management server coupled to the network device and comprising:
     memory configured to store respective past behavior information for users associated with the plurality of user devices; and
     a processor configured to:
       receive, from a first user device of the plurality of user devices, a first request to access a first domain of a network;
       determine that the first request excludes first information associated with a first trust score;
       based on the first request excluding the first information perform an authentication procedure that comprises:
         determining identity information for the first user device, wherein the identity information comprises information for the first user device and information for a first user of the first user device;
         accessing, using the identity information, past behavior information for the first user;
         generating, after the first request is received and by at least using a machine learning model, a first challenge question and a first expected response to the first challenge question based on the past behavior information; and
         authenticating the first user based at least in part on the first challenge question and the first expected response;
       generate, upon authentication of the first user, the first trust score based on the identity information;
       store, in a datastore, the first trust score as a numerical value;
       generate, based on the first trust score and a first domain score of the first domain, first access permissions for the first user device to the first domain, wherein the first access permissions, upon installation at the network device, enable the first user device access to resources associated with the first domain via the network device; and
       transmit the first access permissions for the first user device to the network device; and
   the network device configured to:
     store the first access permissions for the first user device; and
     allow the first user device access to the resources based on the stored first access permissions;
   the processor of the identity management server further configured to:
     receive, from the first user device, a second request to access a second domain of the network;
     determine that the second request includes the first information associated with the first trust score;
     determine, from the datastore, the numerical value of the first trust score based on a lookup of the datastore using the first information;
     determine that a difference between the first trust score and a second domain score of the second domain is within a threshold to grant access to resources associated with the second domain;
     generate, without performing the authentication procedure again and based on the determination that the difference is within the threshold, second access permissions for the first user device to the second domain, the second access permissions allowing the access to the second domain; and
     transmit the second access permissions for the first user device to the network device.

2. The system of claim 1, wherein the first domain corresponds to one or more virtual local area networks (VLANs).

3. The system of claim 1, wherein the first access permissions include an access control list (ACL).

4. The system of claim 1, wherein the resources associated with the first domain are accessible using a respective Internet Protocol (IP) address, a media access control (MAC) address, or a physical port.

5. A method implemented by a server, the method comprising:
   receiving identity information for a first device based on a first request from the first device to access a first domain of a network, wherein a first user is associated with the first device and the first identity information comprises information for the first device and information for the first user;
   determining that the first request excludes first information associated with a first trust score;
   based on the first request excluding the first information, performing an authentication procedure that comprises:
     accessing, from memory, using the first identity information, past behavior information for the first user received from a second device associated with the first user;
     generating, after the first request is received and by at least using a machine learning model, a first challenge question and a first expected response to the first challenge question based on the past behavior information; and
     authenticating the first user based at least in part on the first challenge question and the first expected response;
   generating, upon authentication of the first user, the first trust score based on the identity information;
   storing, in a datastore, a numerical value that indicates the first trust score;
   generating, based on the first trust score and a first domain score of the first domain, first access permissions for the first device to the first domain, wherein the first access permissions, upon installation at a network device, enable the first device access to resources associated with the first domain via the network device;
   transmitting the first access permissions for the first device to the network device;
   receiving, from the first device, a second request to access a second domain of the network;
   determining that the second request includes the first information associated with the first trust score;
   determining, from the datastore, the numerical value based on a lookup of the datastore using the first information;

determining that a difference between the first trust score and a second domain score of the second domain is within a threshold to grant access to resources associated with the second domain;
generating, without performing the authentication procedure again and based on the determination that the difference is within the threshold, second access permissions for the first user device to the second domain, the second access permissions allowing or denying the access to the second domain; and
transmitting the second access permissions for the first user device to the network device.

6. The method of claim 5, wherein the authenticating further comprises:
presenting the first challenge question to the first device;
receiving a response to the first challenge question from the first device; and
validating an identity of the first user based on match of the response to the first expected response.

7. The method of claim 6, wherein the first expected response from the first device is dynamically generated after receiving the first request from the first device to access the network.

8. The method of claim 6, wherein the first challenge question is from a plurality of sets of challenge questions, and wherein each set of challenge questions for the first device and an expected response to each respective set of challenge questions from the first device is unique over a period of time.

9. The method of claim 5, wherein the past behavior information for the first user is associated with an account of the first user with a cloud service that is accessible using the second device.

10. The method of claim 5, wherein the past behavior information for the first user includes information associated with purchase history or search history for the first user.

11. The method of claim 6, wherein the first challenge question and the first expected response are generated by at least inputting the past behavior information to the machine learning model.

12. The method of claim 5, wherein the first identity information further includes information about applications executing or scheduled to be executed on the first device.

13. The method of claim 5, wherein the first access permissions for the first device to the first domain are generated subsequent to comparing the first trust score of the first device with the first domain score, wherein the first trust score is generated further based on information for the first device or the first user stored at the server.

14. The method of claim 13, wherein the first trust score is generated by:
categorizing into categories the first identity information, and the information for the first device or the first user stored at the server into one or more of network information, backup information, device scan information, trust information, connectivity information, or device information;
generating component scores for each of the categories by performing a weighted average of values in each of the respective categories; and
generating the first trust score comprising the component scores.

15. The method of claim 13, further comprising:
receiving a second identity information from a third device, based on a second request from the third device to access the network;
generating, a second trust score for the third device using the second identity information;
determining that a difference between the first trust score and the second trust score is within a threshold; and
granting the third device access to the network based on the determination that the difference is within the threshold, wherein granting the access to the network enables the third device access to the resources associated with the first domain.

16. The method of claim 15, wherein the first access permissions, installed at the network device for the first device, enable the third device access to the resources associated with the first domain via the network device.

17. The method of claim 13, the method further comprising:
updating the first access permissions for the first device to the resources associated with the second domain, wherein the updated first access permissions, upon installation at the network device, enable the first device access to the resources associated with the second domain via the network device; and
transmitting, the updated access permissions for the first device to the network device.

18. The method of claim 17, wherein the domain score for the second domain corresponds to a sensitivity level of resources associated with the second domain.

19. A server comprising a non-transitory computer-readable medium, wherein the non-transitory computer-readable medium comprises instructions executable by a processor of the server to configure the server to perform operations comprising:
receiving identity information for a device based on a first request from the device to access a first domain of a network, wherein a user is associated with the device and the identity information comprises information for the device and information for the user;
determining that the first request excludes first information associated with a first trust score;
based on the first request excluding the first information, performing an authentication procedure that comprises:
accessing, from memory, using the identity information, past behavior information for the user received from another device associated with the user;
generating, after the request is received and by at least using a machine learning model, a first challenge question and a first expected response based on the past behavior information; and
verifying an identity of the user based at least in part on the first challenge question and the first expected response;
generating, upon the identity being verified, the first trust score based on the identity information;
storing, in a datastore, a numerical value that indicates the first trust score;
generating, based on the first trust score and a first domain score of the first domain, first access permissions for the device to the first domain, wherein the first access permissions, upon installation at a network device, enable the device to access resources associated with the first domain via the network device;
transmitting the first access permissions for the device to the network device;
receiving, from the first device, a second request to access a second domain of the network;
determining that the second request includes the first information associated with the first trust score;

determining, from the datastore, the numerical value based on a lookup of the datastore using the first information;

determining that a difference between the first trust score and a second domain score of the second domain is within a threshold to grant access to resources associated with the second domain;

generating, without performing the authentication procedure again and based on the determination that the difference is within the threshold, second access permissions for the first user device to the second domain, the second access permissions allowing or denying the access to the second domain; and transmitting the second access permissions to the network device.

20. The server of claim 19, wherein another device includes a cloud-based device.

\* \* \* \* \*